US012116149B2

(12) United States Patent
Pupille et al.

(10) Patent No.: US 12,116,149 B2
(45) Date of Patent: Oct. 15, 2024

(54) TELESCOPIC SPACE MAST

(71) Applicant: AIRBUS DEFENCE AND SPACE SAS, Toulouse (FR)

(72) Inventors: Gilles Pupille, Toulouse (FR); Adrien Moraine, Toulouse (FR); Victor Pires, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 18/024,458

(22) PCT Filed: Aug. 23, 2021

(86) PCT No.: PCT/FR2021/051477
§ 371 (c)(1),
(2) Date: Mar. 2, 2023

(87) PCT Pub. No.: WO2022/049332
PCT Pub. Date: Mar. 10, 2022

(65) Prior Publication Data
US 2023/0294845 A1    Sep. 21, 2023

(30) Foreign Application Priority Data

Sep. 4, 2020  (FR) ........................ 2009001

(51) Int. Cl.
*B64G 1/22*    (2006.01)
(52) U.S. Cl.
CPC .................... *B64G 1/222* (2013.01)
(58) Field of Classification Search
CPC .............. E04H 12/182; B64G 1/222
See application file for complete search history.

(56) References Cited

U.S. PATENT DOCUMENTS 3,874,136 A * 4/1975 Michel ............... E04H 12/182
                                                     52/118
4,357,785 A * 11/1982 Eklund ............... E04H 12/182
                                                     52/118
(Continued)

FOREIGN PATENT DOCUMENTS

CN    110884690         3/2020
EP    0009451 A1 *    4/1980
(Continued)

OTHER PUBLICATIONS

International Search Report with English Translation for Application No. PCT/FR2021/051477, nine pages, dated Nov. 11, 2021.
(Continued)

*Primary Examiner* — Theodore V Adamos
(74) *Attorney, Agent, or Firm* — Nixon & Vanderhye P.C.

(57) ABSTRACT

A telescopic mast is disclosed including coaxial segments that can be controlled from a stowed position to a deployed position, a set of guide systems disposed between the adjacent segments, a set of systems for synchronising the segments during deployment and a system for driving the segments from the stowed position to the deployed position. Each segment includes the same determined number of angle sections secured together and extending over the entire length of the segment, the number of angle sections being at least three, each segment having a cross-section forming a polygon whose angle sections occupy the vertices of the polygon, each angle having a flat central portion bordered by two side wings, the angle sections of two adjacent segments facing one another. Each guide system is disposed between two adjacent segments being fastened on one of the angle sections of one of the two adjacent segments.

13 Claims, 15 Drawing Sheets

(56) References Cited

U.S. PATENT DOCUMENTS

| | | | | |
|---|---|---|---|---|
| 5,163,650 | A * | 11/1992 | Adams | E04H 12/182 |
| | | | | 248/405 |
| 5,315,795 | A * | 5/1994 | Chae | E04H 12/185 |
| | | | | 343/901 |
| 6,094,881 | A * | 8/2000 | Lockwood | E04C 3/46 |
| | | | | 52/844 |
| 7,574,832 | B1 | 8/2009 | Lieberman | |
| 9,670,948 | B1 * | 6/2017 | Wasson | B66F 3/30 |
| 10,119,292 | B1 | 11/2018 | Harvey et al. | |
| 2006/0213295 | A1 * | 9/2006 | Blackwelder | F16H 25/2056 |
| | | | | 74/89.23 |
| 2007/0028532 | A1 | 2/2007 | Douglas et al. | |
| 2009/0145056 | A1 * | 6/2009 | Pereira | E04H 12/182 |
| | | | | 52/111 |
| 2014/0318040 | A1 | 10/2014 | Edwards et al. | |
| 2015/0050070 | A1 * | 2/2015 | Dykes | F16B 7/14 |
| | | | | 403/109.2 |
| 2015/0211250 | A1 * | 7/2015 | Bach | F16B 2/18 |
| | | | | 52/111 |
| 2017/0130753 | A1 * | 5/2017 | Kemp | F16B 7/105 |
| 2017/0183888 | A1 | 6/2017 | Abe et al. | |
| 2019/0071191 | A1 | 3/2019 | Francis et al. | |
| 2019/0368216 | A1 * | 12/2019 | Young | F16B 7/105 |
| 2021/0039925 | A1 * | 2/2021 | Butler | B66C 23/708 |

FOREIGN PATENT DOCUMENTS

| | | | | |
|---|---|---|---|---|
| EP | 0063783 | A1 * | 11/1982 | |
| EP | 0192094 | A1 * | 8/1986 | |
| EP | 2 108 586 | | 10/2009 | |
| FR | 2 477 204 | | 9/1981 | |
| FR | 2929593 | A1 * | 10/2009 | B64G 1/222 |
| RU | 2760061 | C1 * | 11/2021 | B66F 1/06 |
| WO | WO-2020245751 | A1 * | 12/2020 | A63H 33/009 |

OTHER PUBLICATIONS

Written Opinion of the ISA for Application No. PCT/FR2021/051477, nine pages, dated Nov. 11, 2021.

* cited by examiner

[Fig. 1A]
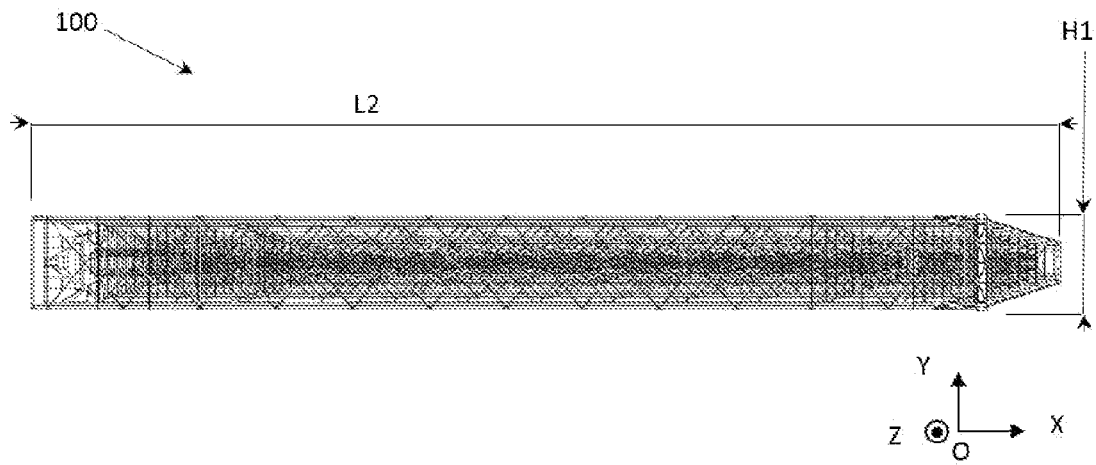
[Fig. 1B]
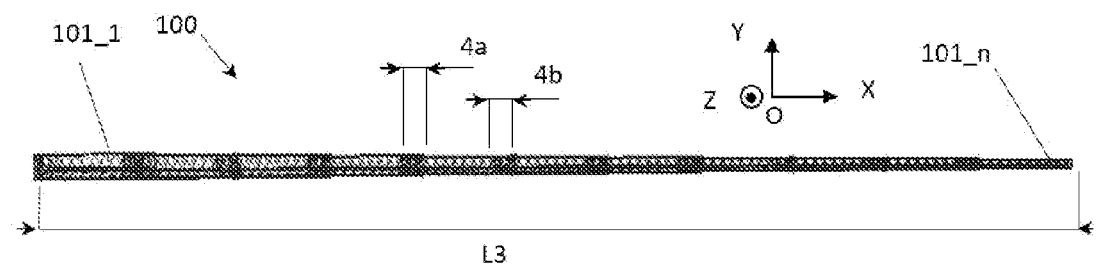
[Fig. 1C]
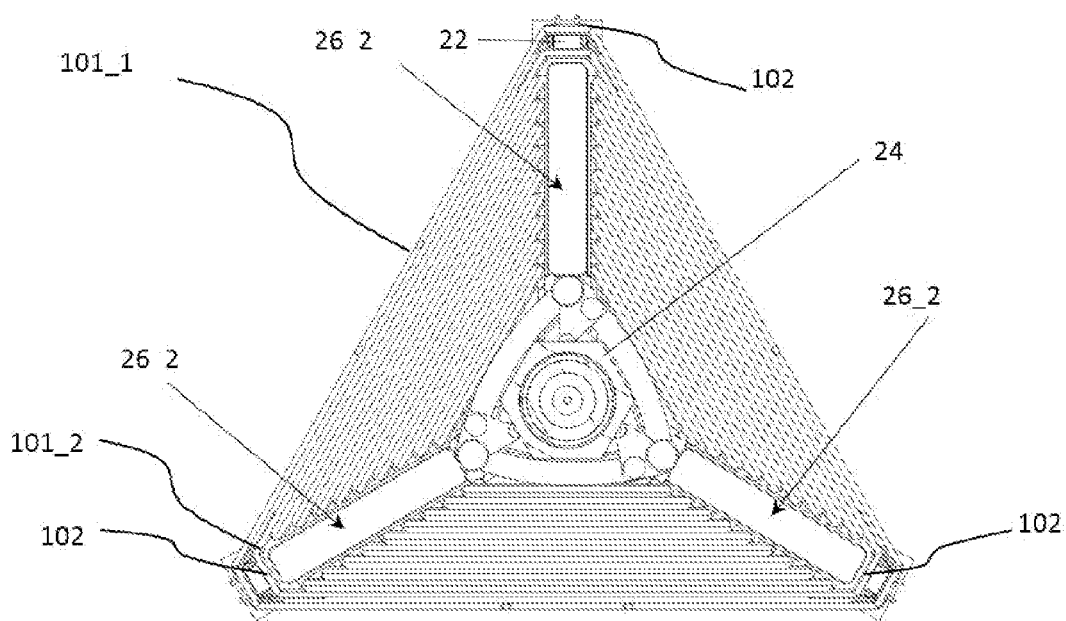

[Fig. 2]
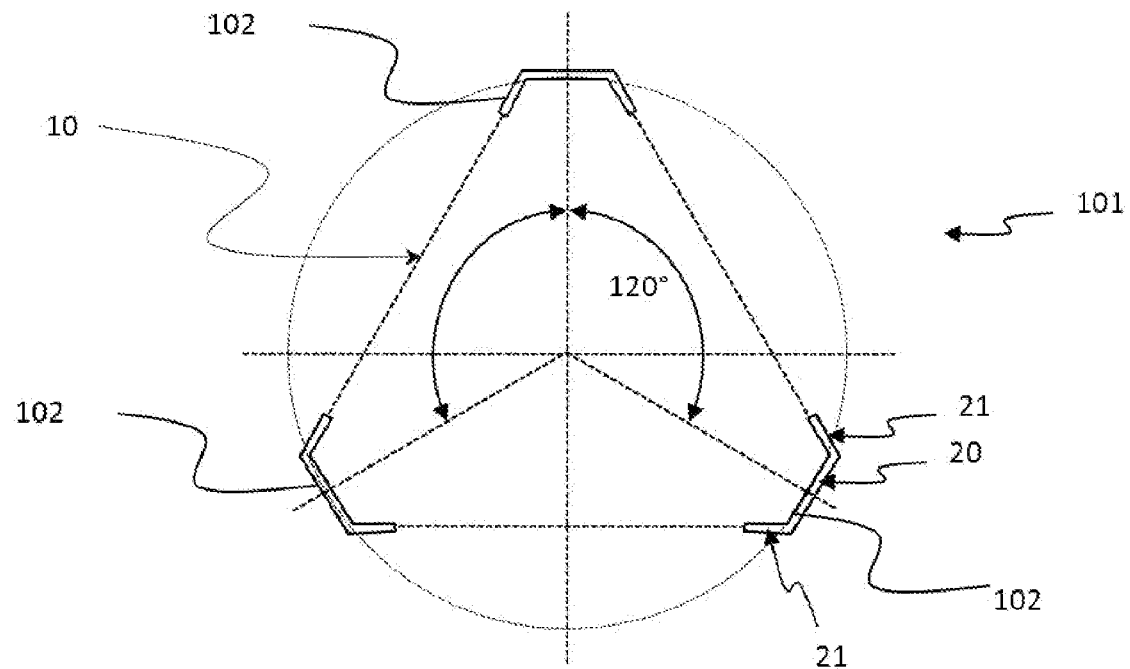
[Fig. 3]
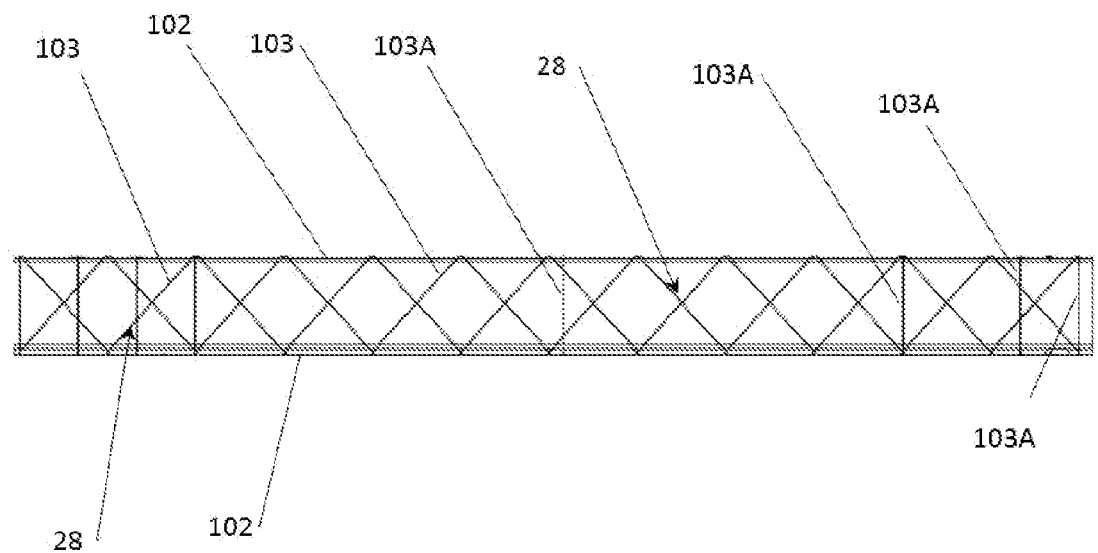

[Fig. 4A]
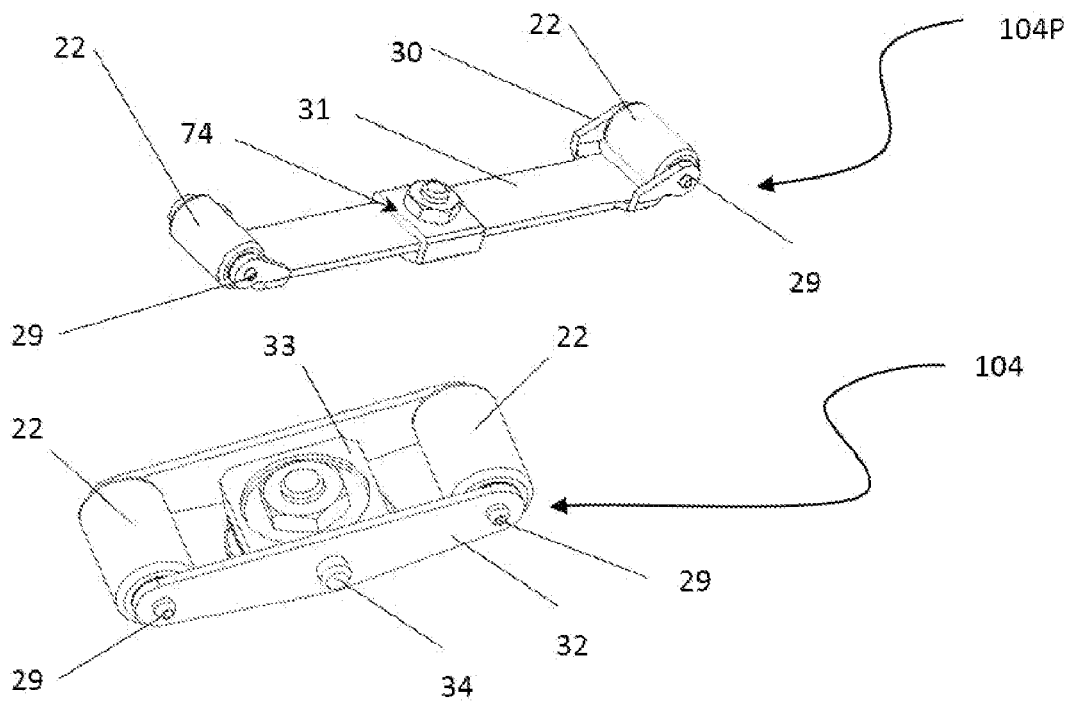
[Fig. 4B]
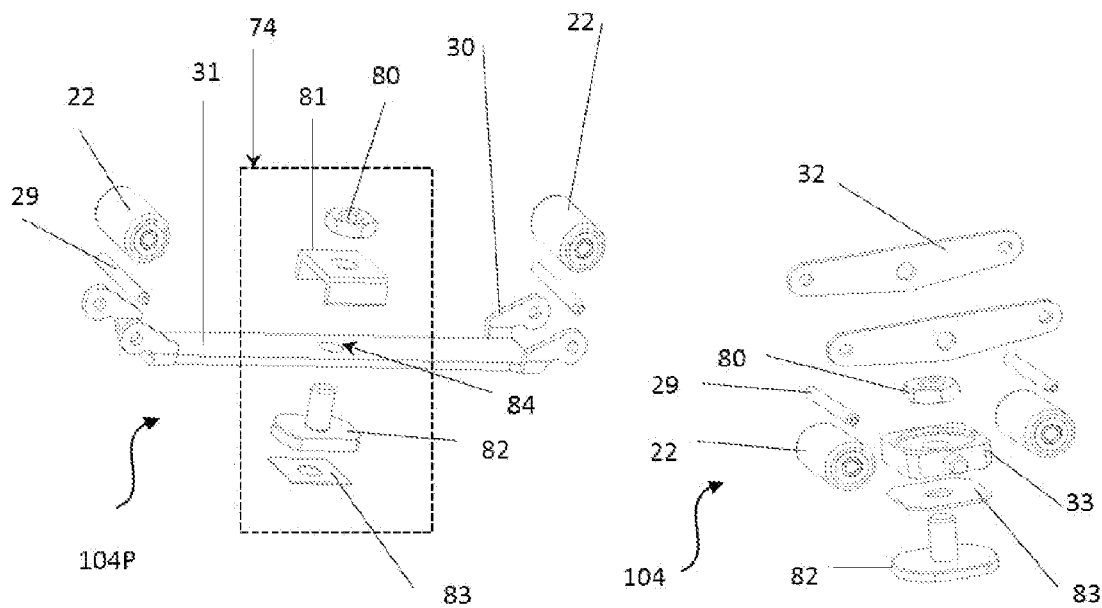

[Fig. 5A]
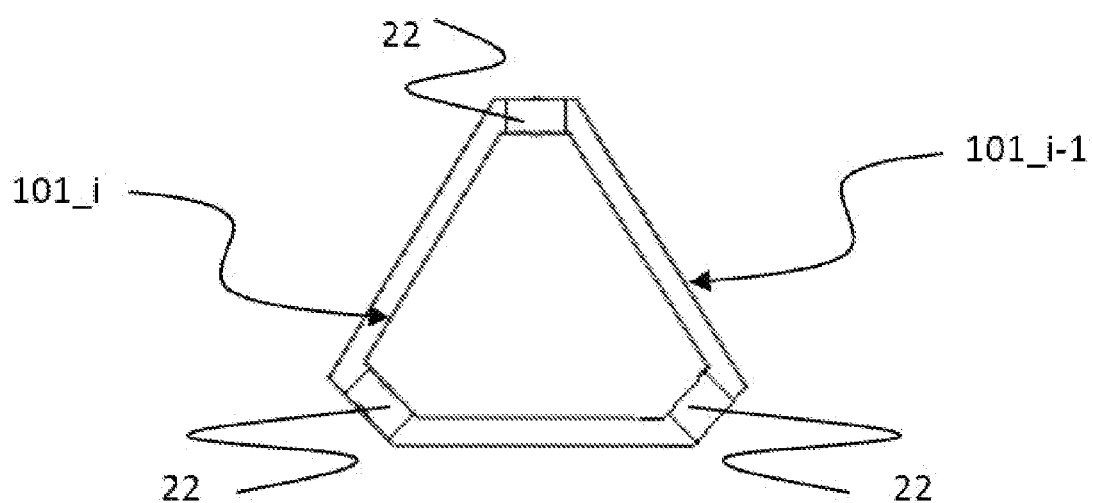
[Fig. 5B]
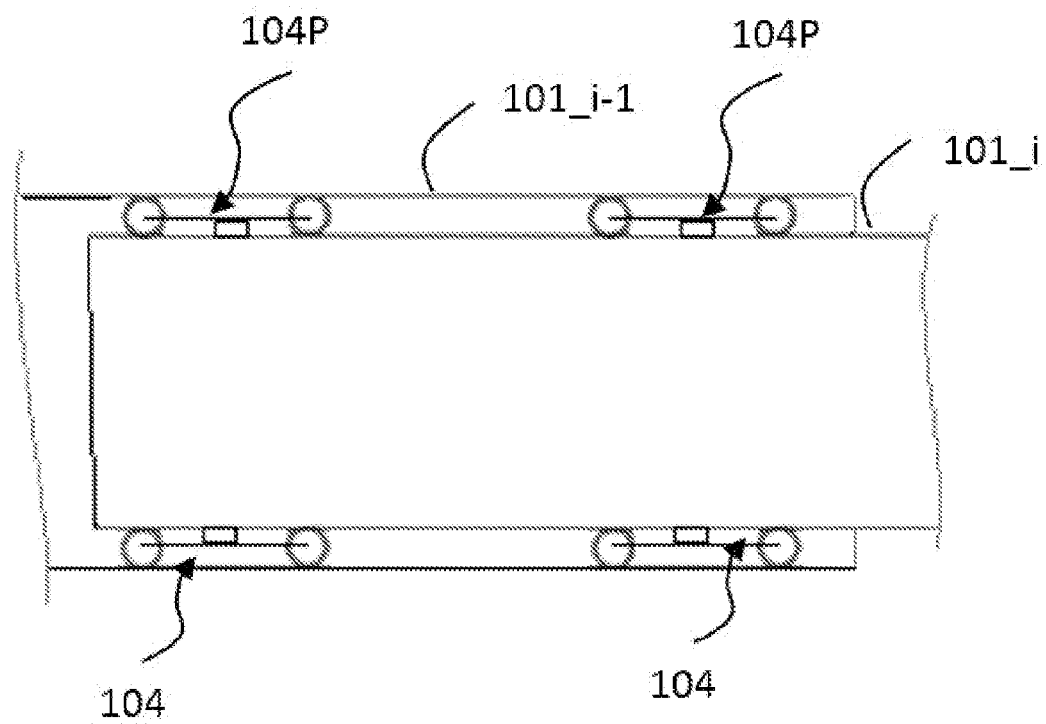

[Fig. 6]
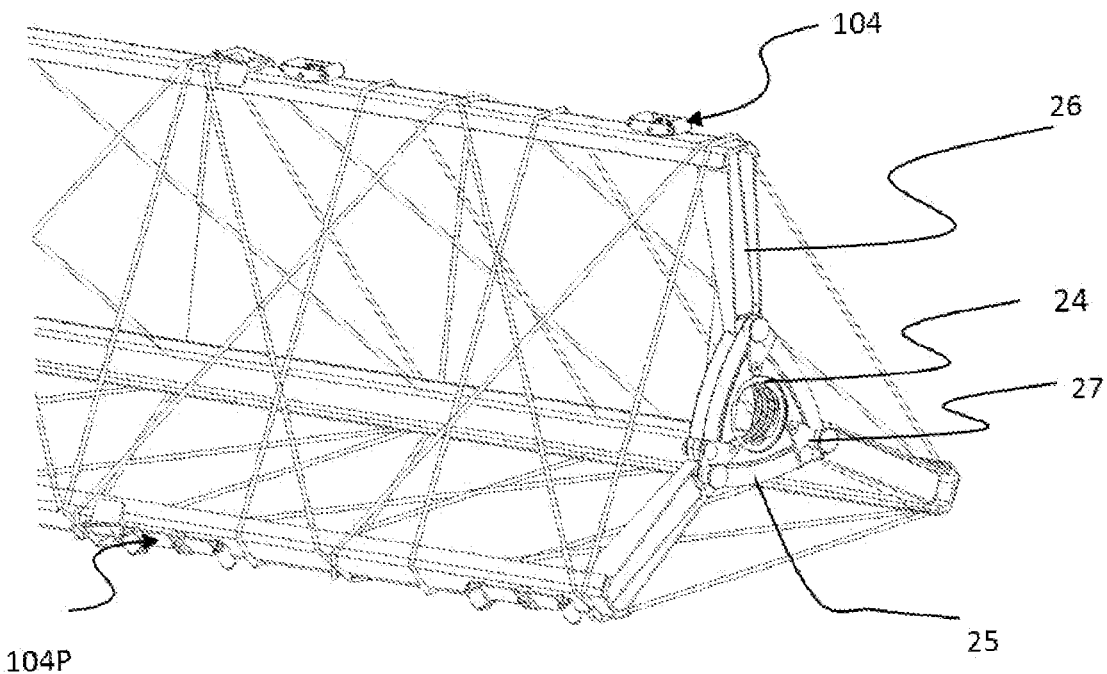
[Fig. 7]
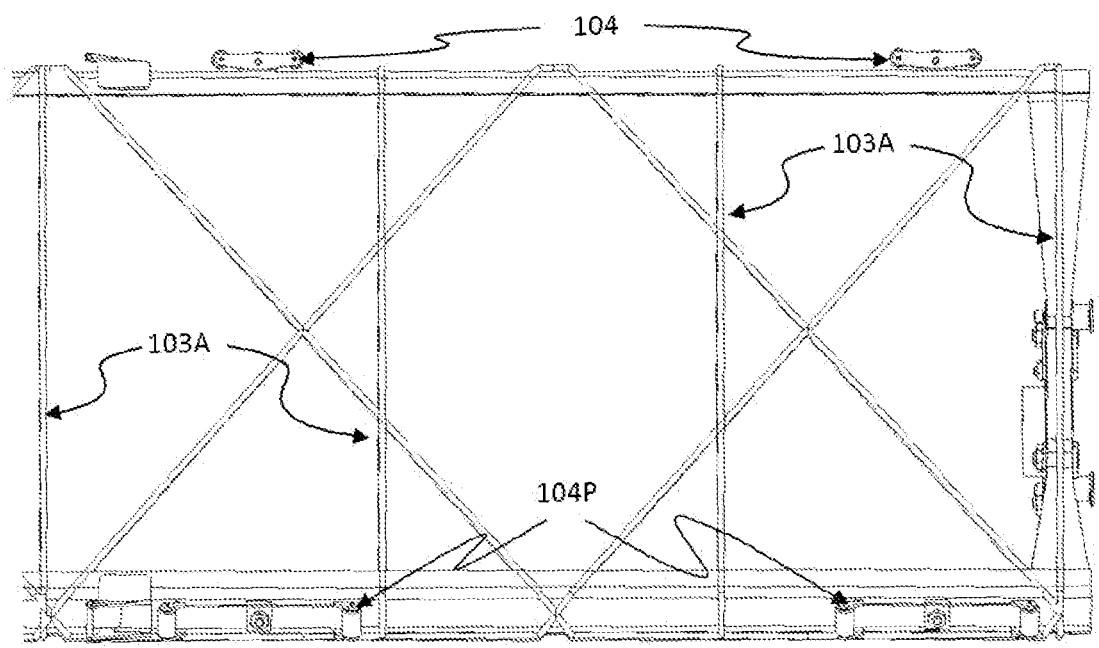

[Fig. 8]
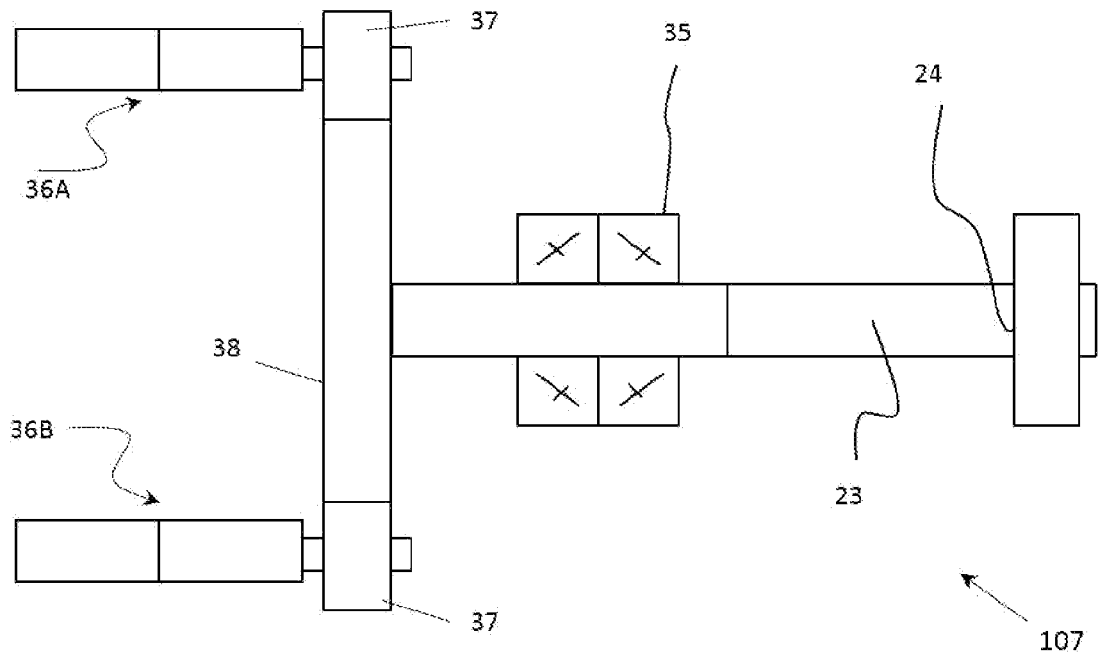
[Fig. 9A]
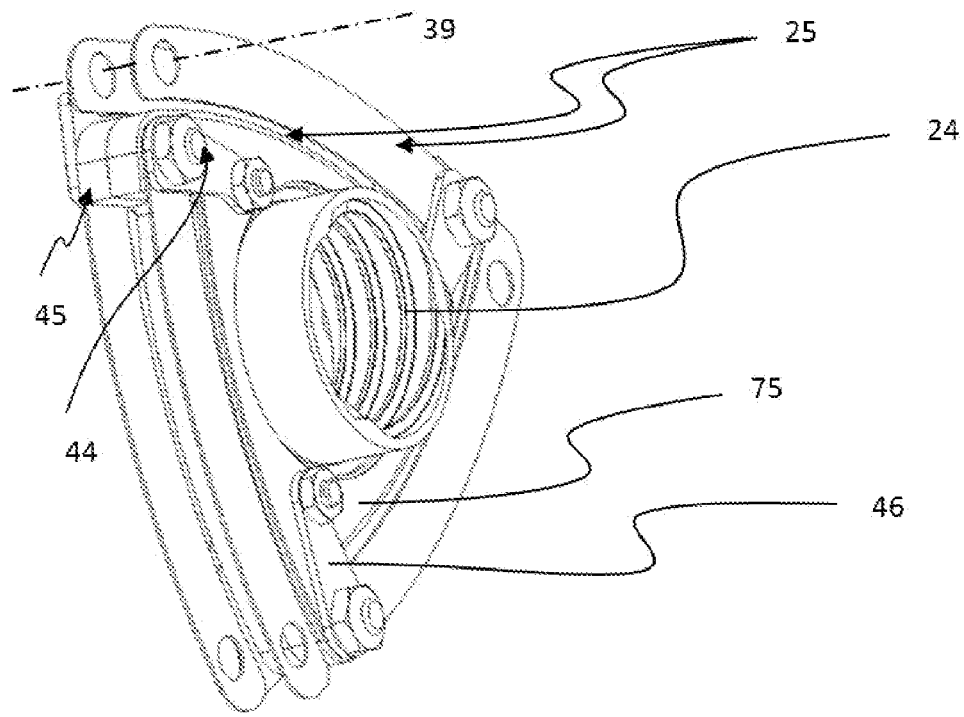

[Fig. 9B]
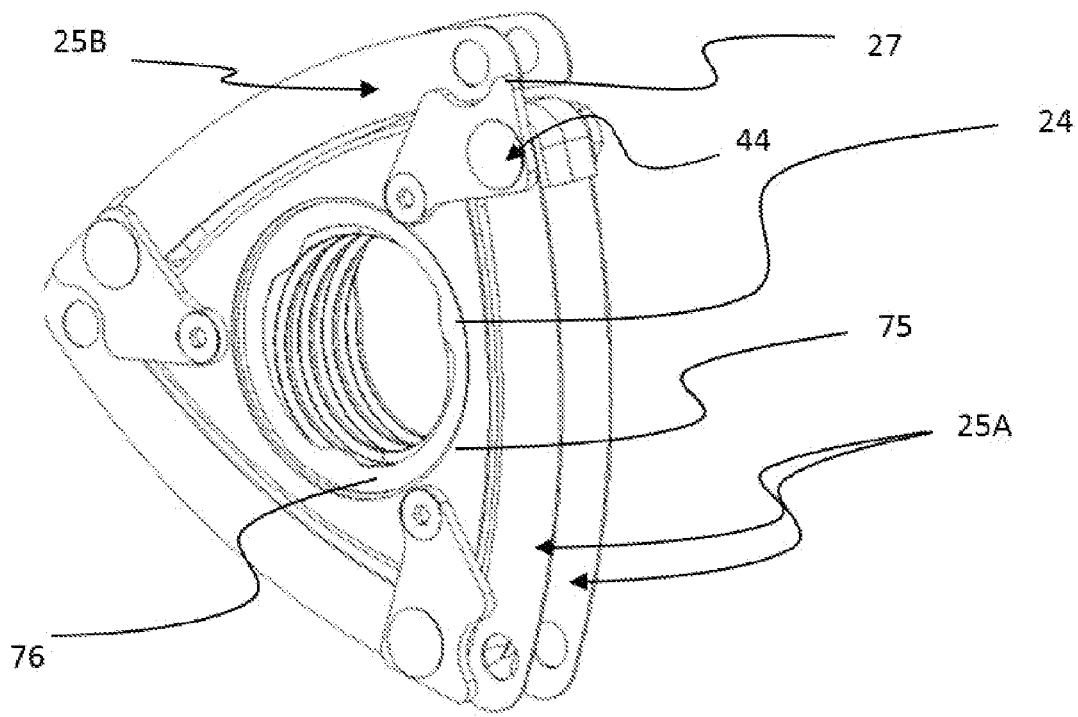
[Fig. 10]
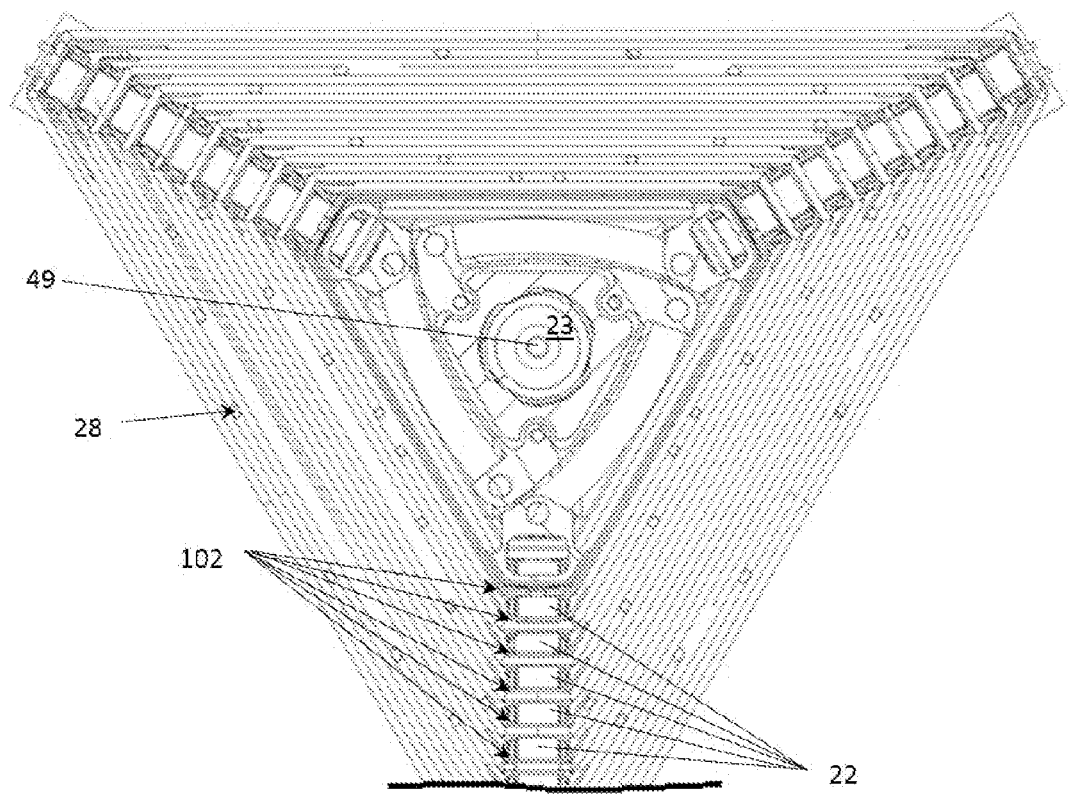

[Fig. 11]
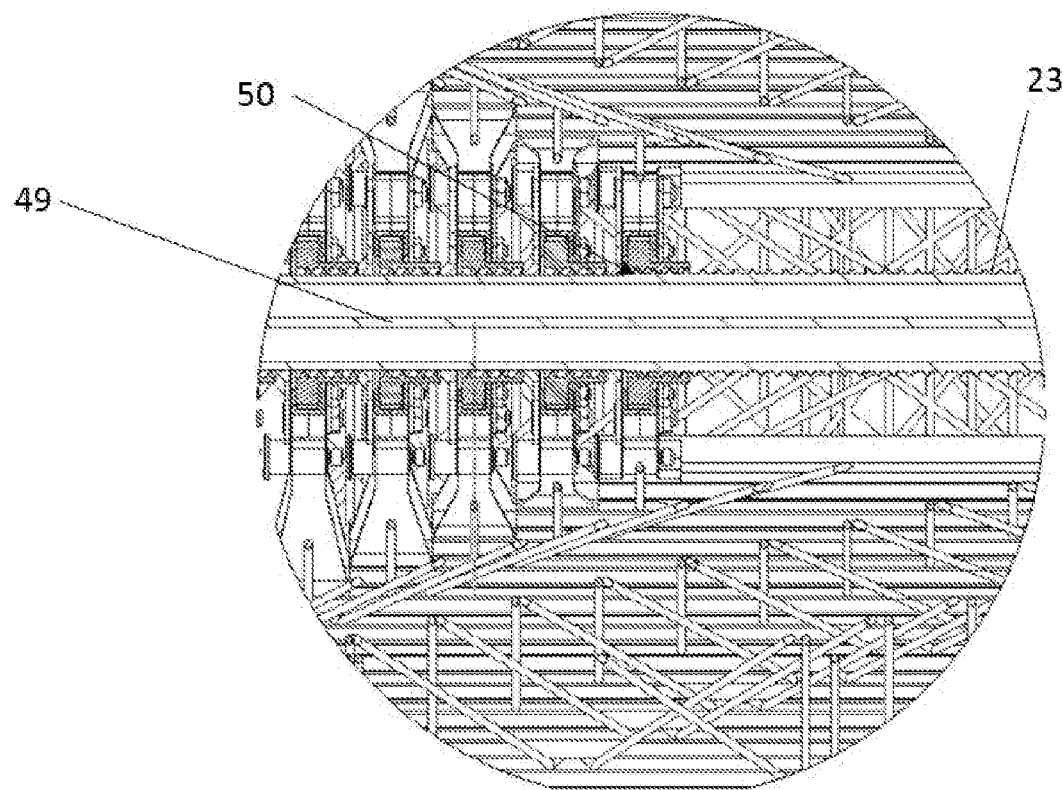
[Fig. 12A]
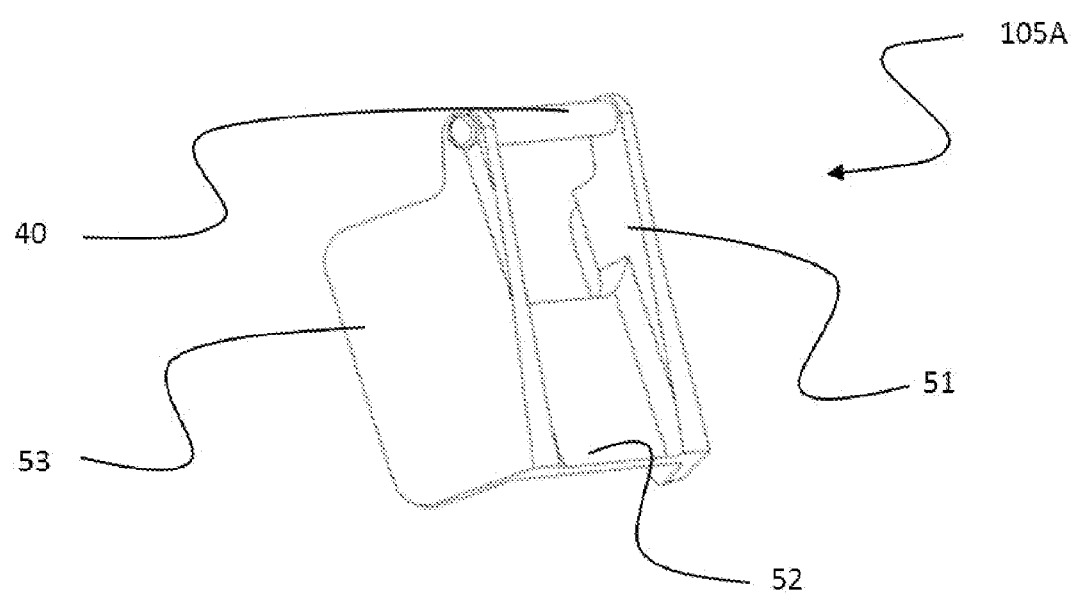

[Fig. 12B]
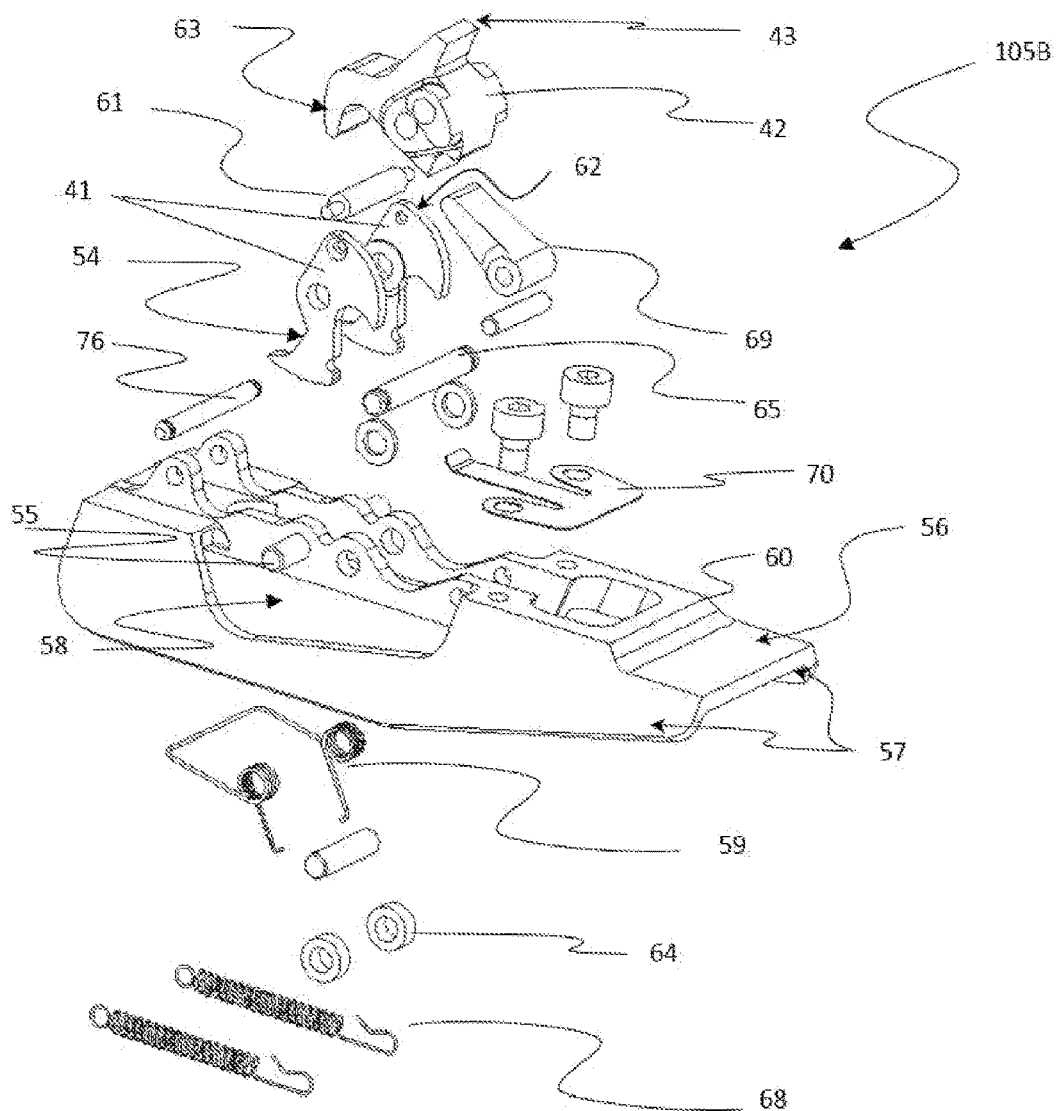
[Fig. 12C]
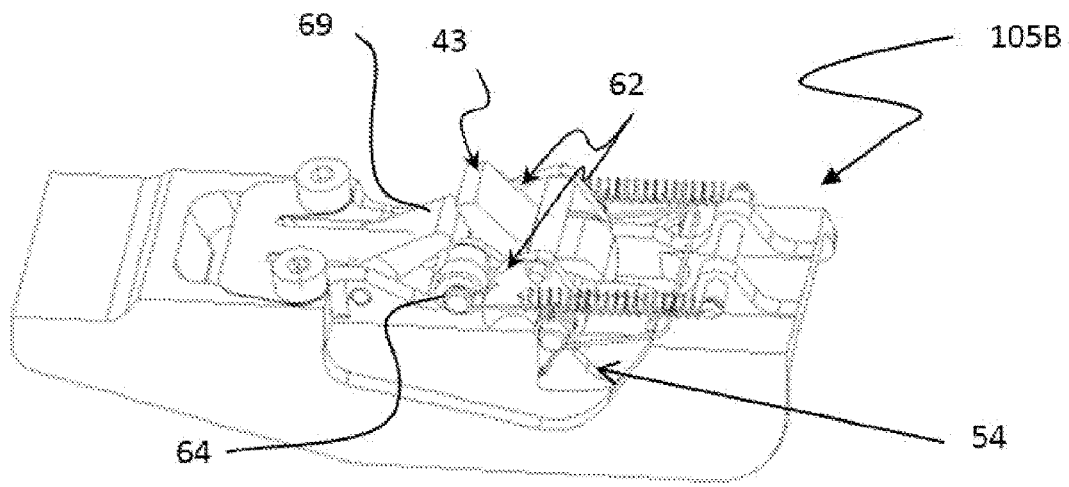

[Fig. 13A]
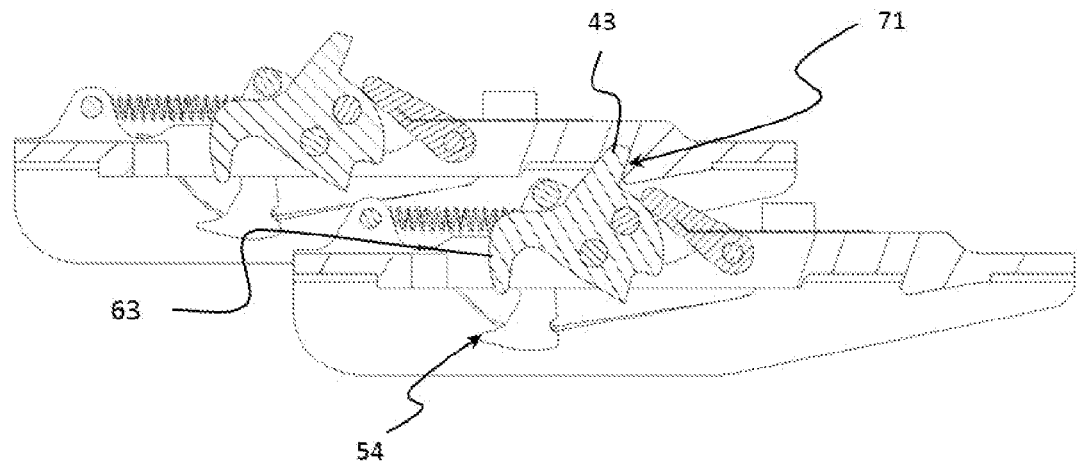
[Fig. 13B]
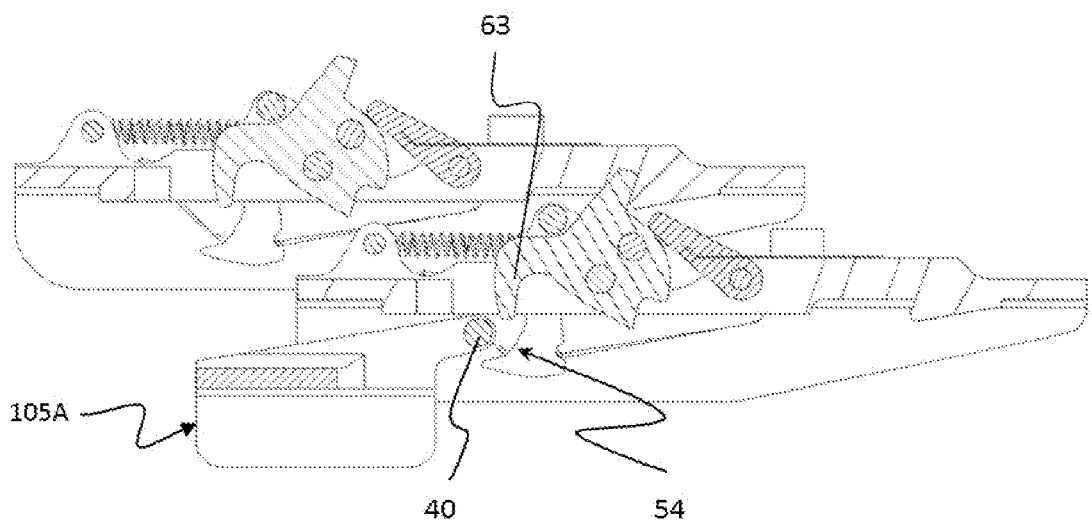
[Fig. 13C]
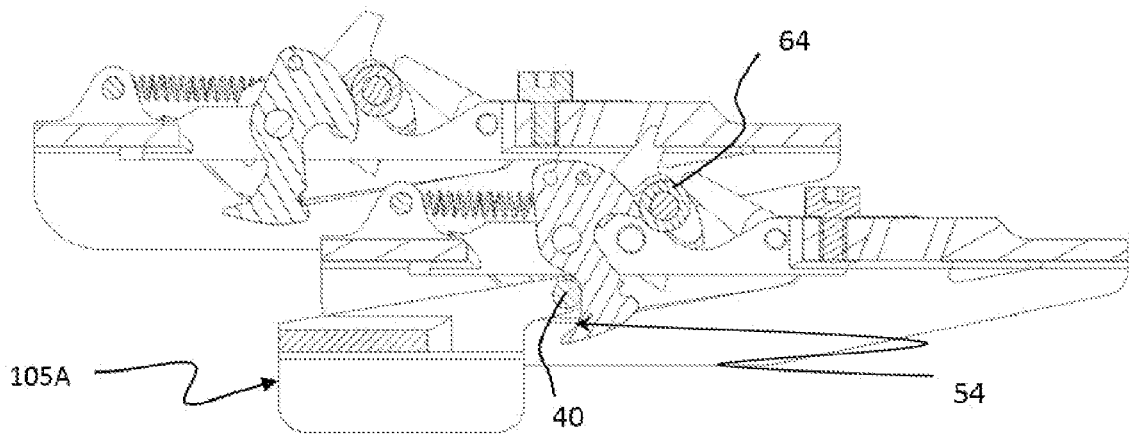

[Fig. 13D]
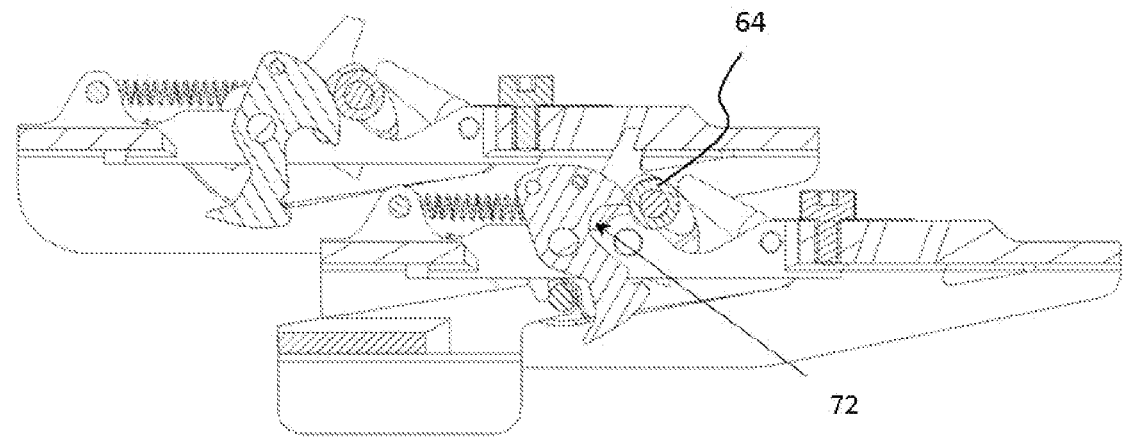
[Fig. 13E]
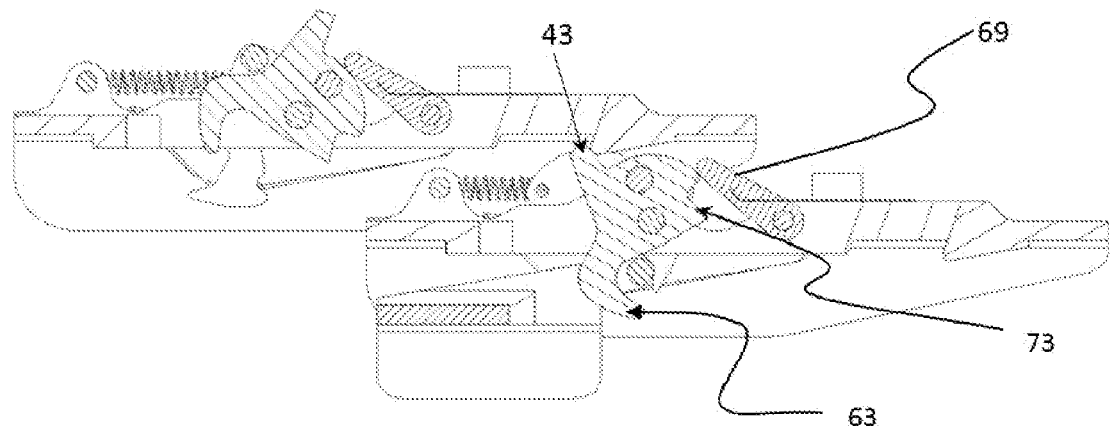
[Fig. 13F]
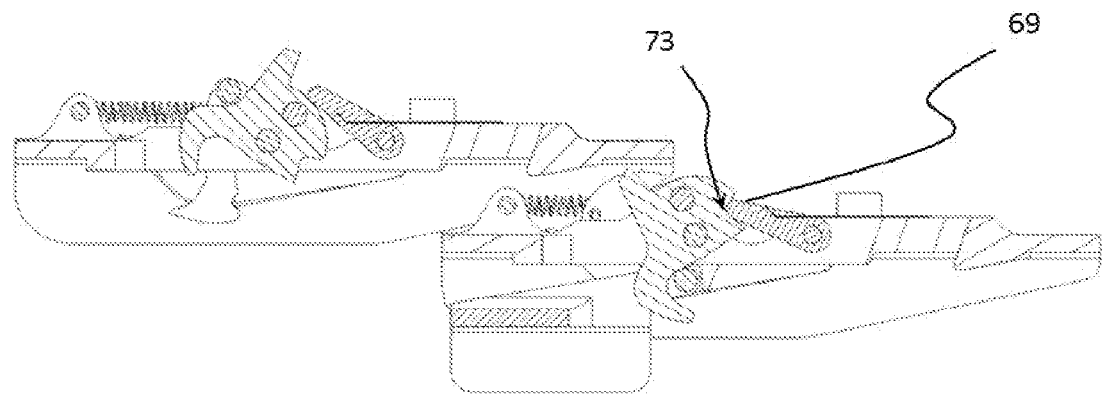

[Fig. 14A]
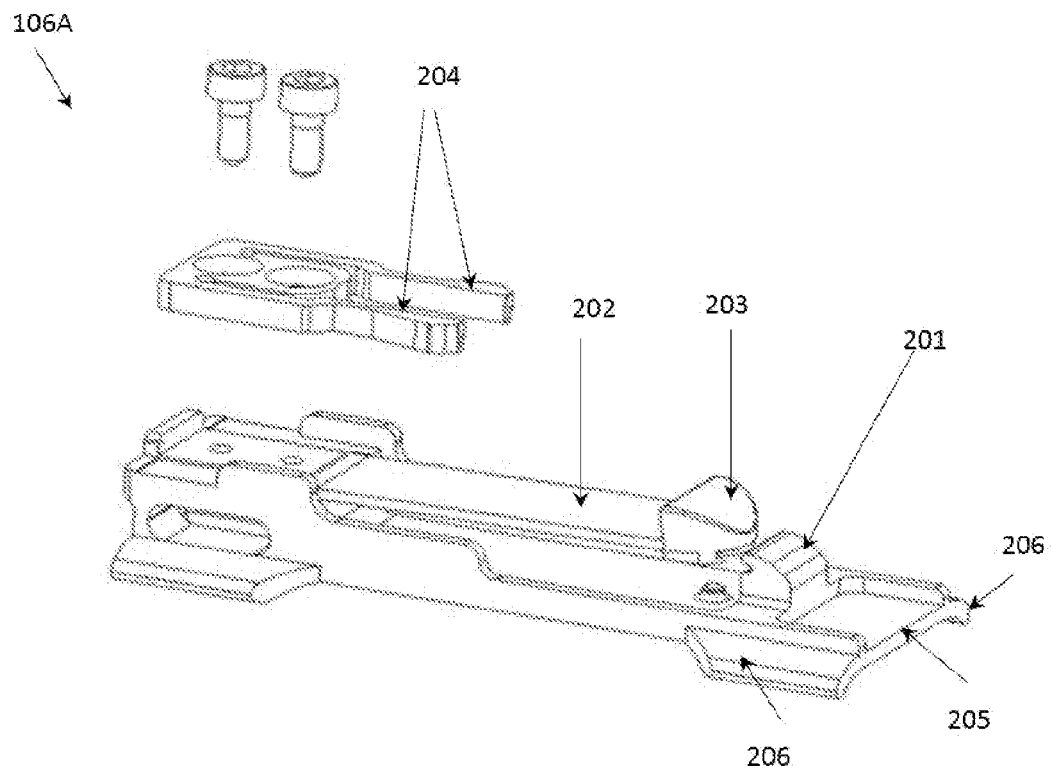
[Fig. 14B]
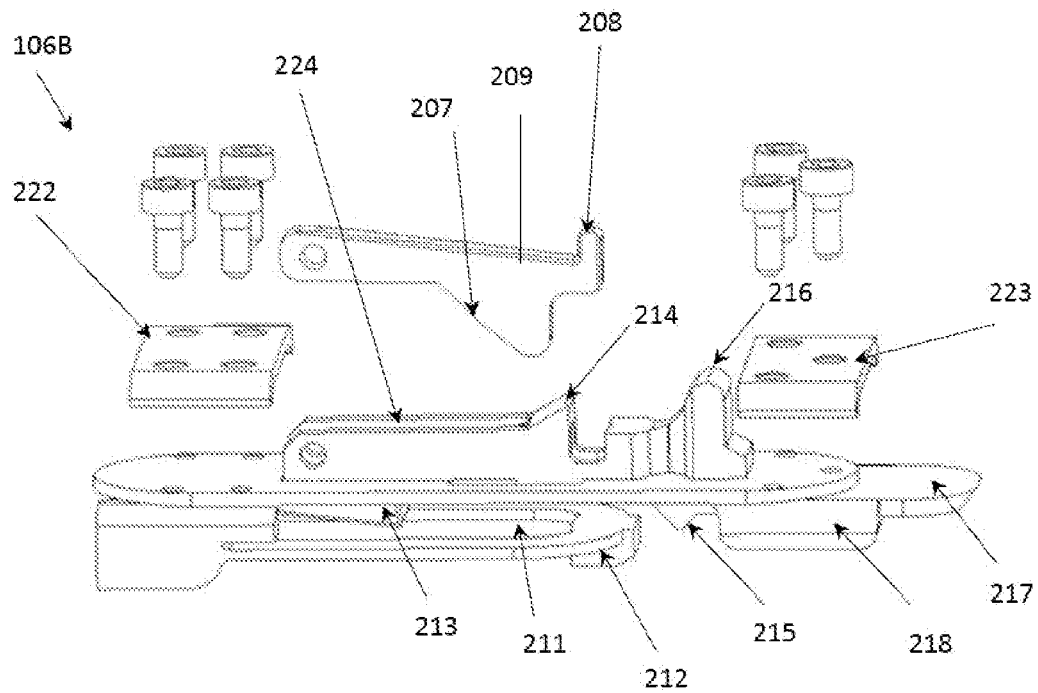

[Fig. 15A]
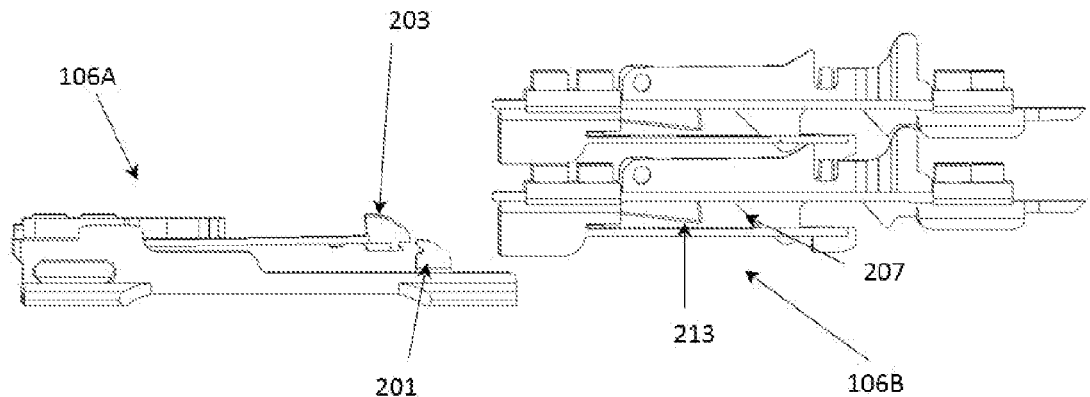
[Fig. 15B]
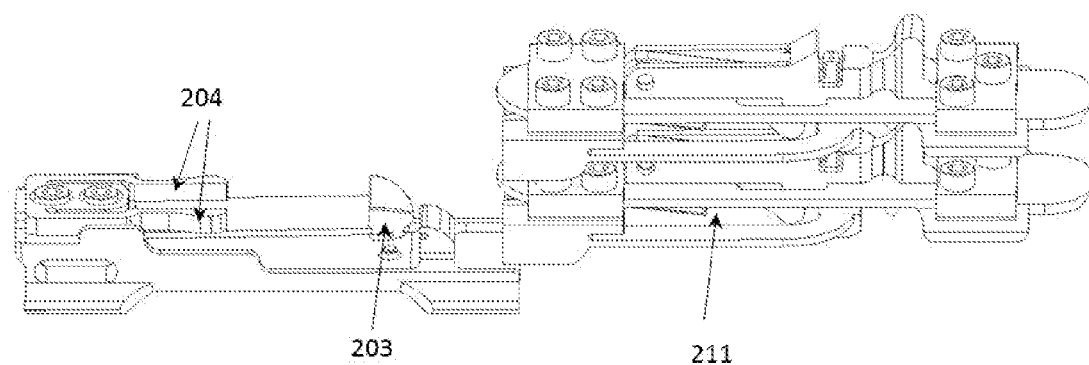
[Fig. 16A]
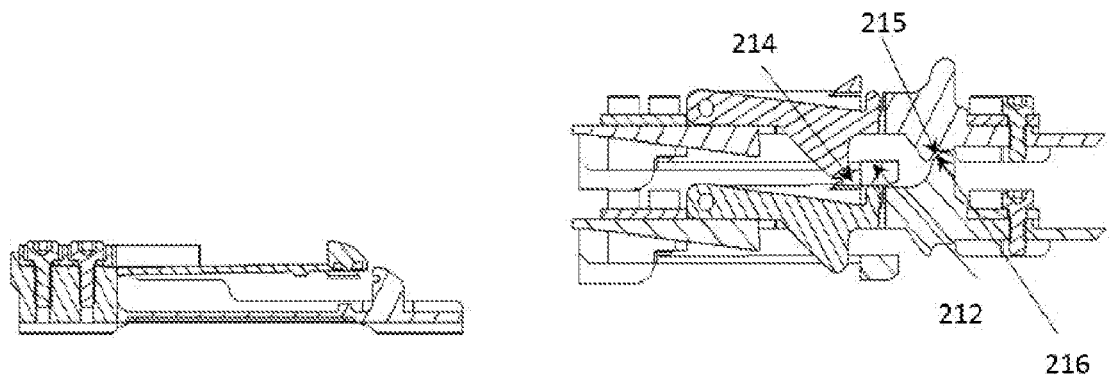

[Fig. 16B]
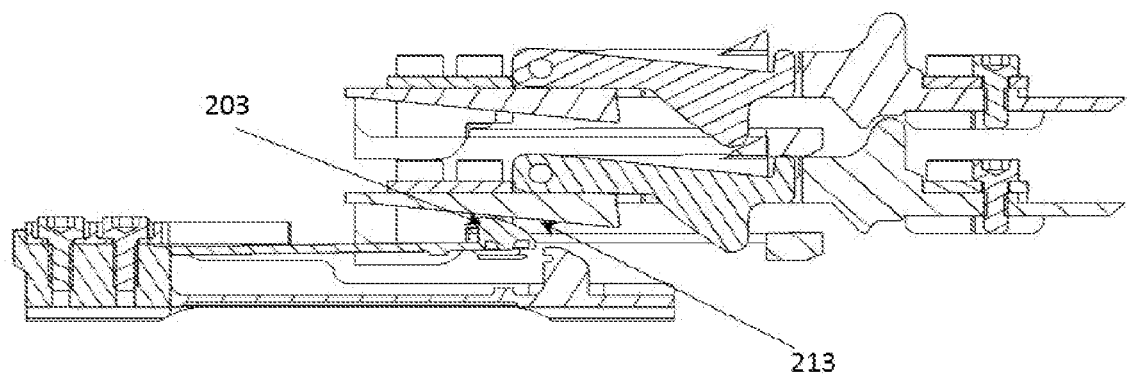
[Fig. 16C]
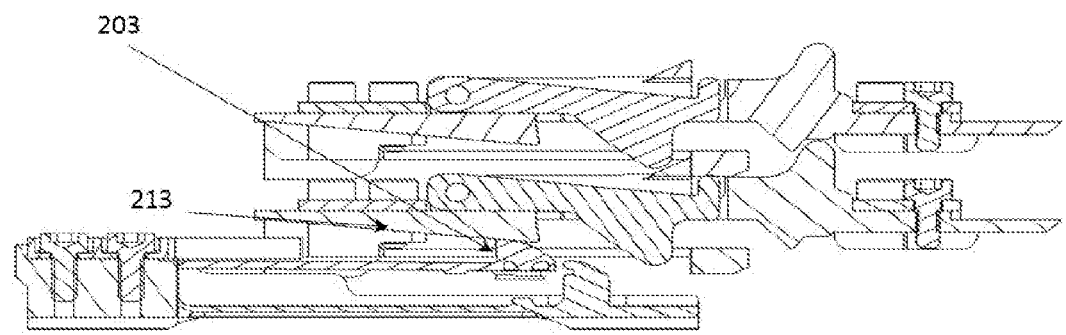
[Fig. 16D]
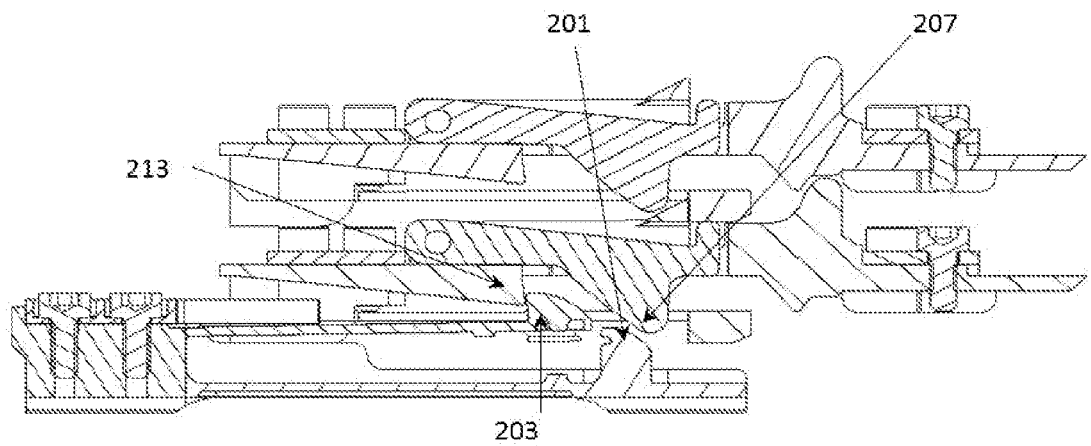

[Fig. 16E]
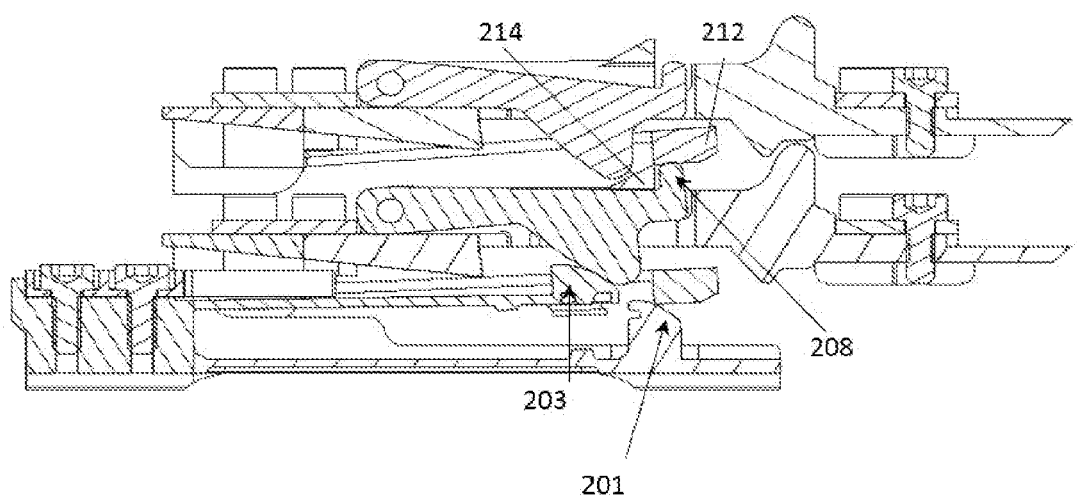
[Fig. 16F]
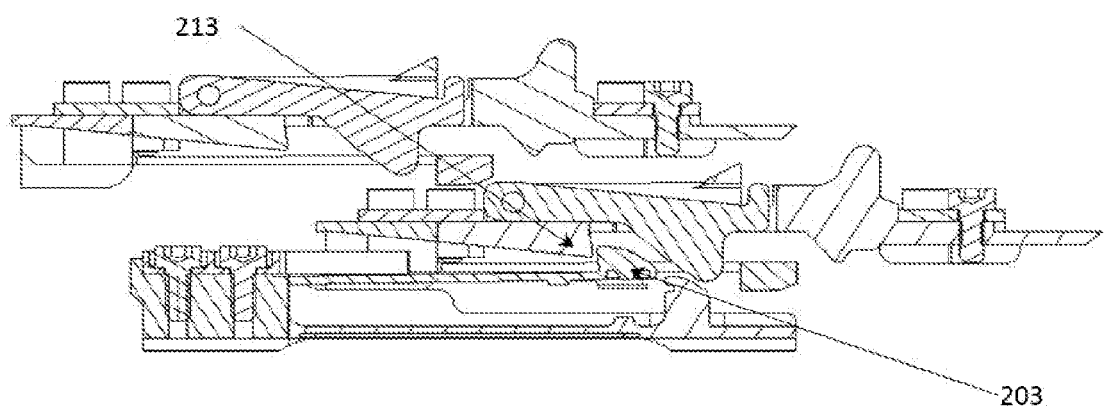
[Fig. 17]
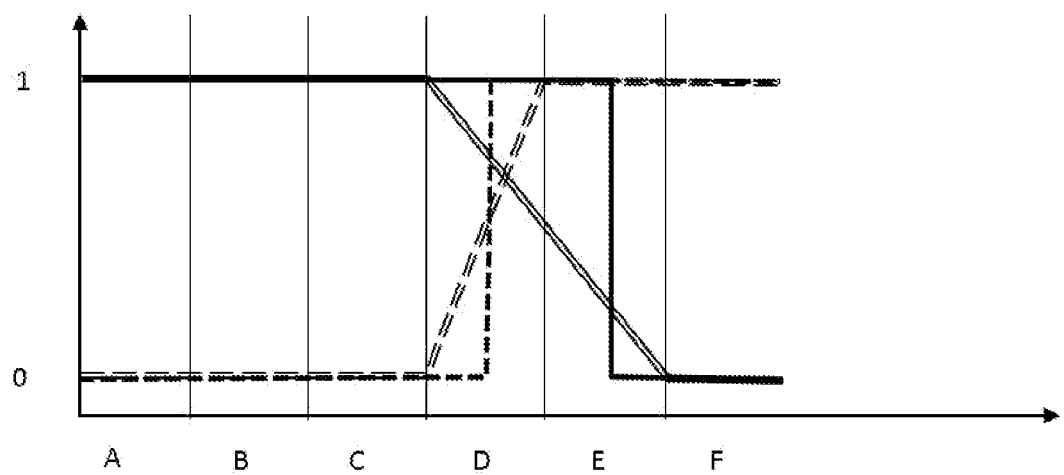

TELESCOPIC SPACE MAST

CROSS REFERENCE TO RELATED APPLICATIONS

The present application is a National Phase of International Application Number PCT/FR2021/051477 filed Aug. 23, 2021, which designated the U.S. and claims priority benefits from French Application Number FR 2009001 filed Sep. 4, 2020, the entire contents of each of which are hereby incorporated by reference.

TECHNICAL FIELD

The invention belongs to the field of space systems.

More particularly, the invention belongs to the field of linear deployment of space equipment. The invention finds particular application in the deployment of flexible solar panels, deflectors, mirrors for optical instruments or antenna reflectors.

PRIOR ART

Solutions for the linear deployment of flexible elements are known from the prior art. The European patent EP 2 108 586 discloses a telescopic mast composed of coaxial cylindrical segments, a motor-driven mechanism for axial deployment, and a set of devices for axial blocking and automatic locking disposed at the junction between two segments. The American patent application US 2019/0071191 discloses a system for deploying flexible membranes, such as those of a flexible solar sail, deployed thanks to a central column and which may include a lattice structure.

DISCLOSURE OF INVENTION

The present invention proposes an alternative to the known systems of the prior art allowing providing a telescopic mast having both great compactness in the stowed position and providing, during deployment, a force adapted in particular to the deployment of a solar sail. The invention relates to a telescopic mast comprising:
  coaxial segments that can be controlled from a stowed position to a deployed position,
  a set of guide systems disposed between the adjacent segments,
  a set of systems for synchronising the segments during deployment and
  a system for driving the segments from the stowed position to the deployed position.

According to the invention, each segment is composed of the same determined number of angle sections secured together and extending over the entire length of said segment, said number of angle sections being at least three, each segment having a cross-section forming a polygon whose angle sections occupy the vertices, each angle comprising a flat central portion bordered by two side wings, the angle sections of two adjacent segments facing one another, each guide system disposed between two adjacent segments being fastened on one of the angle sections of one of said two adjacent segments and comprising rollers rolling on the central portion of the opposite angle section belonging to the other one amongst said two adjacent segments.

In one embodiment, in each segment, each of the angle sections comprises a three-sided profile made of woven fibres forming the central portion and the wings, the neighbouring wings, from one angle section to another, being disposed in the same plane, the angle sections being secured together by securing elements made of fibres pressed on the three-sided profiles, the angle sections and the securing elements being made in one piece, by hardening the fibres.

In one embodiment, the angle sections are secured together by at least two windings per angle section, said two windings being wound respectively clockwise and counterclockwise around the angle sections and starting at two opposite ends of each angle section, said two windings extending over the entire length of the segment, the plies of the multi-ply windings being interwoven at junction points of the windings.

In one embodiment, the number of angle sections per segment being equal to three, each guide system, between two adjacent segments, comprises two pairs of rigid spreaders each carrying two rollers movable in rotation and a pair of flexible spreaders each carrying two rollers movable in rotation, each pair of spreaders being disposed between two angle sections facing one another, the pairs of spreaders being fastened to one of the ends of the segment in an area corresponding to an overlap of the adjacent segments in the deployed position.

In one embodiment, the synchronisation system includes engagement systems and sequencing systems each positioned on an angle section so as to ensure a new drive of one of the segments then a release of this previously immobilised segment, each segment located between the fixed segment and the end segment, comprising at least one engagement system and a sequencing system fastened on one of its angle sections, the end segment carrying an engagement system and the fixed segment carrying a sequencing system, the engagement system of a first segment cooperating with the sequencing system fastened on the angle section facing an adjacent second segment, the sequencing system of the second segment cooperating with the sequencing system fastened on the angle section facing an adjacent third segment, the advance of each segment inducing at least securing of one of the engagement systems with one of the sequencing systems and inducing at least the separation of two of the sequencing systems.

In one embodiment, each engagement system comprises a an outer hooking rod secured to said angle section of the first segment, the hooking rod driving a hook cam of the sequencing system of the second segment, the hook cam being movable in rotation relative to said angle section of the second segment up to a position of abutment and lateral blocking of the hooking rod, the hook cam controlling the position of a hook-like lock movable in rotation relative to said angle section of the second segment up to a locked position where the hook-like lock performs a complementary lateral locking of the hooking rod, the hook-like lock further comprising a finger for blocking the sequencing system of said third segment, this finger disengaging to release the sequencing system of the third segment in the locked position.

In one embodiment, the engagement system of the first segment includes a fixed stop and a movable stop, the sequencing system of the second segment comprising a fixed non-return stop cooperating with the movable stop of the engagement system, the sequencing system of the second segment comprising a fixed stop holding a movable stop of the sequencing system of the third segment, the sequencing system of the second segment comprising a pivotable pawl whose ramp is actuated by the fixed stop of the engagement system of the first segment to clear the movable stop of the sequencing system of the third segment, the ramp of the pawl as well as the fixed stop and the movable stop being arranged so as to fit into a passage arranged between flexible arms carrying the movable stop of the sequencing system of the second segment.

In one embodiment, the drive system includes a threaded rod controlled in rotation and cooperating successively with nuts connected to the bases of the segments, with the exception of the fixed outer segment, each nut being held with a longitudinal clearance in a peripheral support also connected to deformable arms disposed in a radial plane of the nut, these arms being also fastened to beams secured to the angle sections.

In one embodiment, the deformable arms, in undeformed position, bear on wedges disposed parallel to the radial plane of the nut to prevent a translation of the nut towards the base of the mast and enable a translation of the nut towards the distal end of the segment.

The present invention will now be described in more detail in particular with reference to the non-limiting examples represented in the drawings.

BRIEF DESCRIPTION OF THE DRAWINGS

FIG. 1A represents a side view of a telescopic mast according to the invention in the stowed position.

FIG. 1B represents a side view of the telescopic mast of FIG. 1A in the fully deployed position.

FIG. 1C represents a cross-sectional view, at the base of the fixed segment, of the telescopic mast of FIG. 1A in the stowed position.

FIG. 2 represents an example of a geometric configuration for the implementation of a telescopic mast segment according to the invention.

FIG. 3 represents a side view of the geometric configuration of FIG. 2.

FIG. 4A represents perspective views of a rigid spreader and a flexible spreader intended to be placed on the angle sections of the segments of a telescopic mast according to the invention.

FIG. 4B represents exploded views of the rigid spreader and the flexible spreader of FIG. 4A.

FIG. 5A represents the positioning, in a transverse representation, of guide systems between two adjacent segments.

FIG. 5B represents the positioning, in a longitudinal representation, of guide systems between two adjacent segments.

FIG. 6 represents a rear perspective view of a base of a telescopic mast segment according to the invention.

FIG. 7 represents a side view of the base of FIG. 6.

FIG. 8 schematically represents the drive system of the telescopic mast according to the invention.

FIG. 9A represents a perspective view of one face of a nut oriented towards the distal end of a segment according to the invention.

FIG. 9B represents a perspective view of the face of the nut of FIG. 9A, oriented towards the proximal end of a segment according to the invention.

FIG. 10 represents a front view of a telescopic mast in the stowed position.

FIG. 11 represents a detail showing the bases of the nested segments.

FIG. 12A represents an engagement system in a first embodiment.

FIG. 12B represents an exploded view of a sequencing system in the first embodiment associated with the engagement system of FIG. 12A.

FIG. 12C represents a perspective view of the sequencing system in the first embodiment.

FIG. 13A represents a sectional view of the configuration of the synchronisation system, in the first embodiment, during a first step.

FIG. 13B represents a sectional view of the configuration of the synchronisation system, in the first embodiment, during a second step.

FIG. 13C represents a sectional view of the configuration of the synchronisation system, in the first embodiment, during a third step.

FIG. 13D represents a sectional view of the configuration of the synchronisation system, in the first embodiment, during a fourth step.

FIG. 13E represents a sectional view of the configuration of the synchronisation system, in the first embodiment, during a fifth step.

FIG. 13F represents a sectional view of the configuration of the synchronisation system, in the first embodiment, during a sixth step.

FIG. 14A represents an exploded view of an engagement system, in a second embodiment.

FIG. 14B represents an exploded view of a sequencing system, in the second embodiment, associated with the engagement system of FIG. 14A.

FIG. 15A represents a side view of the synchronisation system, in the second embodiment.

FIG. 15B represents a perspective view of the synchronisation system, in the second embodiment.

FIG. 16A represents a sectional view of the configuration of the synchronisation system, in the second embodiment, during a first step.

FIG. 16B represents a sectional view of the configuration of the synchronisation system, in the second embodiment, during a second step.

FIG. 16C represents a sectional view of the configuration of the synchronisation system, in the second embodiment, during a third step.

FIG. 16D represents a sectional view of the configuration of the synchronisation system, in the second embodiment, during a fourth step.

FIG. 16E represents a sectional view of the configuration of the synchronisation system, in the second embodiment, during a fifth step.

FIG. 16F represents a sectional view of the configuration of the synchronisation system, in the second embodiment, during a sixth step.

FIG. 17 schematically represents the successive states of the synchronisation systems, of the first and second embodiments.

DETAILED DESCRIPTION

FIG. 1A represents a side view of a telescopic mast 100 according to the invention in a stowed position where the segments are nested into one another. Advantageously, the segments having a small thickness, it is possible to nest together a large number of segments and thus achieve a significant length when the mast is deployed, while keeping a small footprint in the stowed position of the mast. For example, the maximum overall height H1 is 0.21 metre, enabling eleven segments to nest into one another. For example, this mast in the stowed position has an overall length L2 of 2.3 metres.

FIG. 1B represents a side view of the telescopic mast of FIG. 1A in a fully deployed position. The coaxial segments referenced 101_1 to 101_N can be controlled from the stowed position to a deployed position. For example, this deployed mast comprising eleven segments allows obtaining a length L3 of 17.5 metres. Overlap areas 4a and 4b are provided between each of the adjacent segments to ensure connection of one segment to another. In FIG. 1B, only two overlap areas have been referenced on either side of one of the segments.

The telescopic mast extends according to a longitudinal axis (O, X) according to which it can be deployed, with reference to the orthonormal reference frame (O, X, Y, Z). The axis (O, X) corresponds to the longitudinal axis of the segments and to the axis of the nut and of the control screw in translation. Thus, a transverse plane of the segments or a radial plane of the nut or of the control screw is parallel to a plane (O, Y, Z) and perpendicular to the longitudinal axis (O, X).

In the remainder of the description, the following convention will be adopted: the external segment which remains fastened to the frame, during deployment, is referenced 101_1. The innermost segment which is disposed at the distal end of the mast 100 in the deployed position is referenced 101_N, where N corresponds to the number of segments of the telescopic mast 100. Thus, the segment 101_i corresponds to the i-th segment starting from the outermost segment 101_1.

FIG. 1C represents a cross-sectional view, at the base of the fixed segment of the telescopic mast of FIG. 1A in a stowed position of the mast.

The fixed segment 101_1 has a polygon-shaped section forming for example an equilateral triangle. For example, a regular polygon is selected for the section of the segments. The segments nested into one another have increasingly reduced proportional sections. The segment 101_2 is guided by rollers 22, relative to the segment 101_1, enabling a translation of the segment 101_2 relative to the adjacent segment 101_1. This translation is controlled by a nut 24 cooperating with the thread of a control screw, as described in more detail later on. This nut 24 is held in a triangular structure also connected to beams 26_2 secured to the angle sections 102 of the segment 101_2.

Each of the segments is composed of the same number of angle sections secured together to form a hollow longitudinal structure having a polygonal section. The polygon is flattened at the corners.

The triangular cross-sections are increasingly smaller, the segments with an increasingly smaller section nesting into one another. The polygonal section is herein in the form of an equilateral triangle. The angles of the triangle are flattened and correspond to the location of the angle sections. The angle sections of two adjacent segments face one another.

The section may be in the form of a regular polygon, such as an equilateral triangle. By "regular polygon", it should be understood a polygon all sides thereof have the same length and all angle sections thereof have the same size. Moreover, the angle sections of the polygon are flattened and correspond to the location of the angle sections.

Each of the angle sections, in each segment with the exception of the fixed segment, is connected, at its proximal end, to a nut.

FIG. 2 represents an example of a geometric configuration of a telescopic mast segment according to the invention. The section is herein shaped as an equilateral triangle but could be in the form of another polygon.

Each segment 101 is composed of the same determined number of angle sections 102 secured together and extending over the entire length of the segment 101. The angle sections 102, disposed at the vertices of the polygon, are at least three in number. Each angle section 102 comprises a flat central portion 20 bordered by two side wings 21. The central portion 20 and the wings 21 are formed by a three-sided profile made of woven fibres. These portions of woven fibres are pressed against a mould 10 during manufacture. Thus, the neighbouring wings, from one angle section to another, are disposed in the same plane. Moreover, the angle sections are secured together by securing elements made of fibres pressed on the three-sided profiles and around the mould 10, during manufacture. For example, the angle sections and the securing elements are made in one piece, by hardening the fibres. For example, the fibres are impregnated with resin and then polymerised in an oven. For example, a bladder is provided surrounding the mould 10 then placed under vacuum to press the fibres against the mould 10, before placing it in the oven.

The internal angle between the central portion and each wing forms an obtuse angle, i.e. larger than 90° and smaller than 180°. The value of this angle depends on the number of angle sections and the polygon formed by said angle sections. In the illustrated example, three angle sections are implemented and each of the wings 21 forms with the central portion 20 a 120-degree angle.

A person skilled in the art will understand that a larger number of angle sections can be used. Alternatively, a regular polygon may for example have, in some embodiments that are not represented, four, five, six or eight segments forming its sides. Thus, it is quite possible, for example, to consider a set of four angle sections forming a square or a set of five angle sections forming a regular pentagon.

For example, the angle sections 102 are connected and held together by filament winding, for example by means of carbon fibres or fabric.

By "neighbouring angle sections", it should be understood two angle sections placed at two consecutive vertices of the polygon formed by all angle sections in the same segment.

FIG. 3 represents a side view of the geometric configuration of FIG. 2.

The filament winding comprises a set of windings extending over the entire length of the segment. For example, this assembly comprises two windings 103 per angle section, these two windings 103 winding respectively clockwise and counterclockwise around the angle sections 102 and starting at two opposite ends of each angle section 102. In particular, twisting during baking is avoided for the carbon fibres. Moreover, the geometrical stability is improved.

The segment may also comprise windings 103A disposed according to a radial plane of the segment over its entire periphery. Thus, these windings 103A form belts allowing making the structure more rigid. For example, these belts are disposed at the ends of the segment or at its middle. These belts may also be disposed on either side of the areas provided for fastening guide systems such as spreaders. In particular, excessive bending of the angle sections under the pre-load of the rollers is avoided.

The plies of the multi-ply windings are interwoven at junction points 28 of the windings. The interweaving allows improving the rigidity of the segment.

The windings may also be replaced by fibres deposited individually. The fibres may be deposited over the entire periphery of the segment according to a transverse plane. The fibres may also be wound over the periphery of the segment over the entire length of the segment.

Thus, the segment has a hollow and apertured structure.

FIG. 4A represents perspective views of a rigid spreader and a flexible spreader intended to be placed on the angle sections of the segments of a telescopic mast according to the invention. The flexible spreader 104P comprises two cylindrical rollers 22 movable in rotation about their axis 29. The axes 29 of the rollers 22 are held by lateral lugs 30 secured to a flexible blade 31, itself secured at its middle to an angle section. The flexible blade 31 is connected to an angle section by a central support 74 and is adjustable in height with respect to the angle section. The undeformed flexible blade is disposed parallel to an angle section and perpendicular to the lugs 30. The flexible blade 31 has a determined thickness enabling a deformation of the flexible spreaders disposed in the mast so as to exert a pre-load force. In particular, the pre-load force will be set by adjusting the height of the blade 31 with respect to the angle section. Setting of this height will be performed during mounting according to the actual gap between two successive angle sections. Advantageously, this setting of the pre-load allows compensating for any dimensional inaccuracies of the angle sections. The rigid spreader 104 comprises two cylindrical rollers 22 movable in rotation about their axis 29. The axes 29 of the rollers 22 are held by rigid arms 32 hinged with a support 33 for fastening to an angle section, according to an axis 34 parallel to the axes 29 of the rollers 22. The rigid arms 32 extend according to a plane perpendicular to an angle section and have a thickness enabling conferring enough rigidity thereon such that the axes 29 of the rollers keep a constant distance therebetween and with the pivot connection axis 34 relative to the support 33.

Thus, for segments with three angle sections, two pairs of rigid spreaders are used disposed on two distinct angle sections and a pair of flexible spreaders disposed on the third angle section. The dimensions of the spreaders are selected so that the flexible spreader is deformed, the guide system then being pre-loaded. Thus, the guidance is carried out accurately, without risking a hyperstatic blockage.

FIG. 4B represents exploded views of the flexible spreader and the rigid spreader of FIG. 4A. In particular, the flexible spreader comprises a wedge 83 whose thickness is selected so as to set the height of the blade 31 during mounting. The central support 74 comprises a nut 80 screwed on the threaded rod of a base 82. For example, this threaded rod fits into a bore of the angle section and into a bore 84 of the flexible blade 31. For example, the wedge has a bore and is mounted on the projecting threaded rod of the base 82. Thus, the wedge may be placed between the angle section and the flexible blade 31. The nut 80 is clamped against a U-shaped plate 81 mounted on the flexible blade 31. Thus, the flexible spreader 104P comprises a base 82 comprising a projecting threaded rod passing through bores of an angle section, the wedge 83, the flexible blade 31 and the plate 81 to cooperate with the clamping nut 80.

For example, the rigid spreader 104 also comprises a base 82 comprising a projecting threaded rod passing through bores in an angle section, a wedge 83 and the support 33 to cooperate with a clamping nut 80. For example, the rigid spreader also comprises a wedge 83 whose thickness is selected so as to set the height of the support 33.

FIG. 5A represents the positioning, in a transverse representation, of the spreaders opposite two adjacent segments. Thus, each guide system 104 and 104P is disposed between a segment 101_i-1 and an adjacent segment 101_i whose angle sections face one another. Each guide system is fastened on the central portion of one of the two opposite angle sections whereas its rollers 22 roll against the central portion of the other one amongst the two opposite angle sections. For example, guide systems are provided on the three angle sections for segments with three angle sections.

FIG. 5B represents the positioning, in a longitudinal representation of the spreaders opposite two adjacent segments. For example, two pairs of spreaders are provided on each angle section between a segment 101_i-1 and an adjacent segment 101_i. A flexible pair is fastened on one of the three angle sections whereas two rigid pairs are fastened each on one of the other two angle sections. Each pair of spreaders 104 or 104P is disposed between two angle sections facing one another. The pairs of spreaders 104 or 104P are fastened to one of the ends of the segment 101_i in an area corresponding to an overlap of the adjacent segments in the deployed position, as represented in FIG. 5B.

FIG. 6 represents a rear perspective view of a base of a telescopic mast segment according to the invention.

The spreaders 104 and 104P are fastened on the angle sections, at the base of the segment. The beams 26 are secured to the internal profile of each of the three angle sections. These beams 26 have a length enabling hooking of the three flexible arms 25 for connection with the nut 24. The flexible arms deformed at the same time enable a translation of the nut towards the distal end of the segment. A reverse movement of the nut towards the base of the segment is prevented thanks to the wedges 27.

FIG. 7 represents a side view of the base of FIG. 6.

Two pairs of flexible and rigid spreaders 104 and 104P are represented, one pair of rigid spreaders not being visible. Each spreader is fastened to an angle section between two belts 103A surrounding the segment radially over its entire periphery.

Thus, each angle section is secured to a pair of spreaders, disposed one behind another and fastened on an outer face of the central portion of this angle section. The spreaders fastened on the outer faces of the angle sections of the segment 101_i, are also disposed with their rollers bearing against the inner faces of the central portions 20 of the angle sections 102 of the adjacent external segment 101_i-1. Each roller of each spreader, flexible or rigid, rolls on the central portion of an angle section, between the wings of this angle section which are disposed on either side of the roller.

The flexible spreaders 104P, mounted between two angle sections of two adjacent segments, are pre-loaded by elastic deformation of their roller support arms. This pre-loading exerts a constant force between two angle sections of two adjacent segments, in the stowed position, during deployment and in the deployed position of the telescopic mast 100. The flexible spreaders have a determined, so-called "low" stiffness, allowing ensuring maintenance of the pre-load compensating for any geometric variations of the angle sections which might be deformed at the locations where the spreaders are fastened or in contact with the rollers and which might also have shape defects. If, for example, triangular section segments are considered, the centres of the circumscribed circles for different sections, all along the same segment, may feature a lack of concentricity between successive sections or the diameter of these circles may vary.

Each of the rigid spreaders 104 supports two cylinders with parallel axes on a plane formed by the angle section 102 of the external segment 101_i-1 with which the rollers are in contact. Thus, each rigid spreader achieves a connection equivalent to a cylindrical bearing in linear support. Thus, the pairs of rigid spreaders and the pairs of flexible spreaders are advantageously combined, so as to have a pre-loaded system while avoiding having an hyperstatic system.

In the mast, the flexible spreaders may be distributed all around the mast from one segment to another. The flexible spreaders may also be disposed on the same edge of the mast, from one segment to another, which facilitates mounting when setting the final position of the flexible spreader upon mounting.

FIG. 8 schematically represents the drive system of the telescopic mast according to the invention.

The drive system 107 includes a set of two geared motors 36A and 36B providing electrical redundancy for deployment. Each of the geared motors 36A and 36B is connected to a pinion 37, secured to the output shaft of the geared motor. These pinions 37 engage with a toothed wheel 38 secured to the threaded rod 23. For example, the drive system 107 includes two rows of angular contact bearings 35 guiding the threaded control rod 23 in rotation relative to the frame. Thus, the threaded rod, driven in rotation, controls a longitudinal translation of the nuts 24. The nuts 24 are successively driven by the threaded rod 23. Two nuts are simultaneously driven when one of the nuts engages the thread of the threaded rod, whereas the other nut disengages.

FIG. 9A represents a perspective view of a face of a nut oriented towards the distal end of a segment according to the invention.

Each nut 24 is held by pairs of deformable arms 25 disposed in a radial plane of the nut 24. Moreover, these arms are fastened to the beams for securing to the angle sections, around an axis 39 parallel to the axis of the nut 24. The arms are fastened on either side around two axes 39 and 44 held parallel to each other by spacers 45 and thus enable a translation of the nut 24 by elastic deformation of the arms 25. For the clarity of the drawing, only one of the two spacers 45 has been represented. One of the axes 44 is secured to a support 75 of the nut 24, by a plate 46. The nut 24 has a threaded cylindrical portion and is connected to the peripheral support 75 enabling in particular fastening to the plate 46 connected to the arms 25. For example, the peripheral support 75 has a triangular section. The peripheral support 75 also holds the nut with a clearance enabling a radial backlash of the nut.

The arms 25 extend in a radial plane of the nut 24 in the form of curved blades. Their thickness according to the longitudinal plane as well as their length and their width according to the radial plane are selected so as to enable a determined elasticity.

FIG. 9B represents a perspective view of the face of the nut of FIG. 9A, oriented towards the proximal end of a segment according to the invention.

For holding thereof with a radial backlash, the nut is extended for example laterally by a collar 76 held in an inner housing of the peripheral support 75. The shaft 44 is also secured to the support of the nut 24 and to the arms 25A by a wedge 27 which also extends radially to come opposite a neighbouring arm 25B and thus prevent movement thereof in one direction. The wedges 27 fastened on the face of the support of the nut disposed towards the proximal end of the segment, prevent a translation of the nut 24 in the rest position, towards the proximal end and enable translation thereof towards the distal end. Thus, the deformable arms 25, in undeformed position, bear on wedges 27 disposed parallel to the radial plane of the nut 24. During the deployment of the segment 101_i, the nut transmits to this segment a pushing force exerted by the helical connection of the screw 23 on the nut 24. Advantageously, the translational movement enabled by the elastic arms allows conferring a degree of freedom, in particular when two nuts are driven simultaneously on the control screw.

FIG. 10 represents a front view of a telescopic mast according to the invention. In this position, the bases are stacked on top of one another. The segments between the fixed segment and the end segment are held by the sequencing systems held in pairs. The nut of the end segment 101_N is engaged with the threaded control rod which holds it stationary. Moreover, the entire mast in the stowed position is held by a stacking system allowing pressing all segments against the frame, in particular during transport and in particular upon launch. The stacking system is cleared before start of the deployment. The stacking system comprises a central cable 49 pulling the end of the mast in the stowed position, towards its base. The complete stacking system is not represented.

The geometry and in particular the length of each beam depends on its location in the mast. The dimensions of each beam enable the transmission of the pushing forces to the angle sections.

In the stowed position, the angle sections 102 are disposed one above another and positioned with respect to one another thanks to the rollers 22 of the spreaders. In each segment, the angle sections are secured together by filament winding and interweave at junction points 28.

FIG. 11 represents a detail at the base of the segments in the stowed position of the mast. Only the end segment is engaged in the thread. The end of the thread on the proximal side of the control rod is indicated by the reference 50. Thus, once the stacking system 49 is cleared, the threaded control rod 23 can be controlled in rotation to make this segment N move forwards. For example, the threaded rod 23 is hollow to fit the cable 49 for retaining the stacking system. The threaded rod 23 is controlled in rotation and cooperates successively with the nuts 24 connected to the bases of the segments, with the exception of the fixed outer segment. The segment N is the first to deploy then, when its nut comes close to the threaded end of control rod 23, the synchronisation system drives the next segment N−1 which is also released from segment N−2. The nut of the segment N−1 then engages with the threads of the control rod 23, then the nut of the segment N releases from the control rod 23. The joining of the segments N and N−1 is done thanks to the synchronisation system. The joining of the segments N−1 and N−2 then their separation is also done thanks to the synchronisation system. The synchronisation system includes engagement systems and sequencing systems each positioned on an angle section so as to ensure a new drive of one of the segments then a release of this previously immobilised segment.

Each segment located between the fixed segment and the end segment comprises at least one engagement system and one sequencing system fastened on one of its angle sections. The end segment carries at least one engagement system whereas the fixed segment carries at least one sequencing system.

The engagement system of a segment N cooperates with the sequencing system fastened on the angle section opposite an adjacent segment N−1. Moreover, the sequencing system of the segment N−1 cooperates with the sequencing system fastened on the angle section opposite an adjacent segment N−2. The advance of each segment induces joining of an engagement system with a sequencing system and induces the separation of two sequencing systems.

Thus, the telescopic mast according to the invention enables the linear deployment of space equipment, while having a low mass and good reliability. For example, the space equipment may be a flexible solar sail, a deflector, a mirror for an optical instrument, an antenna reflector. The frame, connected to the fixed segment, corresponds for example to the body of the satellite or to a movable support connected to the satellite. In particular, the polygonal structure of the segments composing the telescopic mast has the following advantages:

the polygonal section naturally ensures anti-rotation during guidance;
the polygonal lattice structure allows significantly reducing the mass of the mast, reducing the production costs, and reducing the thermoelastic sensitivity of the mast when the latter is exposed to the Sun;
the pre-loaded guidance ensures an excellent deployment accuracy, regardless of the deployment conditions, and imparting an adequate deployment force to a solar sail as well as an adequate stiffness in the deployed position to a solar sail;
the telescopic mast according to the invention allows achieving a compactness ratio higher than two, the compactness ratio being herein defined as the ratio between the length of the mast in the deployed position and the length of the mast in the stowed position.

For example, it is possible to provide for an engagement system and a sequencing system per angle section. It is also possible to provide for some of the angle sections devoid of an engagement system and a sequencing system, along one or more edge(s) of the mast. Synchronisation systems, according to first and second embodiments, ensuring excellent reliability of the kinematics will now be described.

FIG. 12A represents an engagement system in a first embodiment.

The engagement system 105A comprises an outer hooking rod 40 held by support portions 51 in which the hooking rod is held by its ends. The hooking rod 40 is perpendicular to the longitudinal axis of the angle section and perpendicular to an axis normal to the central portion of this angle section. The hooking rod has a length corresponding to the width of the central portion of the angle sections and a circular section. The support portions 51 extend above the angle sections and are extended on the one hand by a spacer 52 which is fastened against the central portion of an angle section and on the other hand by wings 53 which are fastened against the wings of an angle section. By "above" the angle section, it should be understood a position farther away from the centre of the segment than the angle section, according to a radial direction. Conversely, by "below" the angle section, it should be understood a position closer to the centre of the segment than the angle section, according to a radial direction.

FIG. 12B represents an exploded view of the sequencing system in the first embodiment associated with the engagement system of FIG. 8.

The sequencing system 105B comprises a support 60 fastened on an angle section comprising a central portion 56 fastened on the central portion of the angle section and extended by wings 57 fastened on the wings of the angle section. An aperture 58 is formed in the central portion 56 and the wings 57 of the support 60, an opposite passage being also formed in the angle section. This passage enables a movement of the cam 41 and of the locking hook 42 to block the hooking rod along the inner face of the angle section.

The hook cam 41, formed by two twin profiles, forms a hook 54 intended to hold the hooking rod 40 of an engagement system. The hook cam 41 is hinged about an axis 55 relative to the support 60. Moreover, the cam 41 is resiliently held by a spring 59. The cam 41 comprises a shaft 61 forming on the one hand a spacer between its two twin profiles and on the other hand a stop against the support 60 at the end of rotation. The cam comprises an area 62 controlling a locking hook 42 in position. This area terminates in an indentation enabling rotation of the locking hook to release its finger and complementarily block the hooking rod of the engagement system.

The locking hook 42 comprises a hook-like portion 63 intended to block the hooking rod 40 of an engagement system. Thus, this hooking rod will be blocked between the hook cam 41 and the locking hook 42. The locking hook 42 is movable in rotation relative to the support 60. To this end, the locking hook comprises a central bore for its axis of rotation. Moreover, the locking hook comprises an off-centre bore receiving a support axis 65 of two hollow cylindrical rollers 64 cooperating with the control area 62 of the cam 41. This axis 65 also enables hooking of springs 68 attached to an axis 76 held to the support 60 and resiliently holding the locking hook. The locking hook also comprises its securing finger 43 cooperating with the support of another engagement system. In the locking position of the locking hook 42, this finger 43 is cleared from the support of this other engagement system.

Moreover, the locking hook 42 is held in its locked position thanks to a pawl 69 cooperating with a non-return housing of the locking hook. This pawl 69 is movable in rotation relative to the support 60 and resiliently held in position by a spring 70.

Each of the pawl, the hook cam and the locking hook comprises their axis of rotation perpendicular to the longitudinal axis of the angle section and perpendicular to an axis normal to the central portion of this angle section.

FIG. 12C represents a sequencing system in the first embodiment associated with the engagement system of FIG. 8.

The pawl 69 is raised and resiliently held against the locking hook, leaving it free to rotate. The position of the locking hook is determined thanks to its holding springs. The locking hook comprises its finger 43 in a projecting position above the angle section so as to collaborate with the support of another sequencing system. The position of the locking hook is controlled by the hook cam which has its control surfaces 62 bearing on the rollers 64. Moreover, the hook cam comprises its hooks 54 projecting under the angle section. The rotation of the hook is prevented by the control surface 62 of the cam in this position where this surface 62 extends according to a constant radius around the axis of rotation of the cam. Thus, the rollers 64 connected to the locking hook exert a force passing through the centre of rotation of the cam, which blocks the rotating hook.

FIG. 13A represents a sectional view of the configuration of the synchronisation system, in the first embodiment of FIG. 8, during a first step.

The two sequencing systems are held fixed relative to each other. The finger 43 of one of the sequencing systems bears on an inner surface 71 of the support of the other sequencing system. As explained with reference to FIG. 12C, the locking hook is blocked in position by the cam. The hook 54 of the cam projects under the angle section whereas the hook-like portion 63 of the locking hook is raised.

FIG. 13B represents a sectional view of the configuration of the synchronisation system, in the first embodiment, during a second step.

The raised hook-like portion 63 of the locking hook enables the hooking rod 40 to pass. The hook 54 of the cam projecting under the angle section is disposed at the height of the hooking rod 40.

FIG. 13C represents a sectional view of the configuration of the synchronisation system, in the first embodiment, during a third step.

The hooking rod 40 pushes the hook 54 of the cam which then rotates about its axis, against the holding force of its spring. The roller 64 connected to the locking hook remains stationary, bearing on the surface with a constant radius of the cam.

FIG. 13D represents a sectional view of the configuration of the synchronisation system, in the first embodiment, during a fourth step.

The system is positioned just before tilting of the locking hook. The roller 64 is disposed at the end of the surface with a constant radius and at the edge of a portion 72 set back with respect to the cam.

FIG. 13E represents a sectional view of the configuration of the synchronisation system, in the first embodiment, during a fifth step.

The hook no longer being blocked in rotation, it tilts so as to have its hook-like portion 63 blocking the hooking rod 40. Thus, the hooking rod is blocked, in its longitudinal translational movement, by the locking hook and by the cam. Moreover, the finger 43 of the locking hook is cleared from the support of the other sequencing system. This results in the separation of the two segments. The sequencing system is positioned just before tilting of the pawl 69 in the housing 73 for locking the pawl.

FIG. 13F represents a sectional view of the configuration of the synchronisation system, in the first embodiment, during a sixth step.

The pawl 69 has swung into the housing 73 provided in the locking hook. Thus, the locking hook is immobilised against the pawl 69 and against the hooking rod. The cam is also immobilised against the support and bearing against the hooking rod. This results in securing the two segments.

Advantageously, the use of elements that are exclusively movable in rotation, for the synchronisation system, allows guaranteeing good reliability during deployment. The rotational movements allow for a greater reliability and repeatability than parts sliding against each other in translation, for example.

FIG. 14A represents an exploded view of an engagement system, in a second embodiment.

The engagement system 106A includes a support comprising a central portion 205 fastened on the central portion of the angle section and wings 206 fastened on the wings of the angle section. The engagement system 106A includes a fixed stop 201 secured to its support and disposed in front of a movable stop 203. The movable stop 203 is disposed at the end of a flexible blade 202 connected at its other end to the support of the engagement system. Thus, the movable stop 203 can get resiliently closer to the angle section on which the support is fastened. The flexible blade 202 extends parallel to the central portion of the angle section. Two flexible tabs 204 extending longitudinally at the side edges of the flexible blade 202 and above the flexible blade, to achieve guidance relative to the sequencing system. Moreover, the movable stop 203 has a rounded front face also facilitating guidance relative to the sequencing system.

FIG. 14B represents an exploded view of a sequencing system, in the second embodiment, associated with the engagement system of FIG. 10.

The sequencing system 106B comprises a central portion 217 fastened to the central portion of the angle section and wings 218 fastened to the wings of the angle section. Plates 222 and 223 are screwed to the support to hold the angle section clamped between the plates and the support.

The sequencing system comprises a fixed non-return stop 213 secured to the support and cooperating with the movable stop 203 of the engagement system. This fixed stop 213 is in the form of a ramp extending towards the inside of the segment and disposed opposite a passage 211. This passage 211 is made between the flexible arms of a movable stop 212 of the sequencing system. These flexible arms are fastened on the one hand to the support and meet on the other hand at the movable stop 212.

The sequencing system further comprises a fixed stop 214 holding a movable stop 212 of another sequencing system. This fixed stop 214, which projects above the angle section, is placed opposite the passage 211 and at a space for the movement of a pawl 209. The pawl 209 positioned against this stop 214 then has its release pin 208 rising along the stop 214. Thus, the movable stop 212 of the other sequencing system can be cleared by the pin 208 of the pivotable pawl 209, this pawl 209 being actuated by the fixed stop 201 of the engagement system. Thus, the pawl 209 comprises a release pin 208 and a control ramp 207. This control ramp 207 is intended to meet the fixed stop 201 of the engagement system. Thus, the ramp 207 of the pawl as well as the fixed stop 201 and the movable stop 203 of the engagement system fit into the passage 211 arranged between the arms carrying the movable stop 212 of the sequencing system. The release pin 208 of the pawl 209 is intended to act on the movable stop 212 of the other sequencing system. Moreover, an aperture is formed in the angle section in particular to enable movement of the pawl 209.

The support also comprises wedging stops 215 and 216. The lower wedging stop 215 is intended to cooperate with the upper wedging stop 216 of another engagement system in a stowed position of the segments. In particular, these wedging stops allow holding the segments pressed against each other, for example by the stacking system set up during transport.

FIG. 15A represents a side view of the elements of the synchronisation system, in the second embodiment.

The movable stop 203 of the engagement system is disposed at a height such that it will cooperate with the fixed non-return stop 213 of the sequencing system 106B. At the end of its stroke, the movable stop will meet the ramp 207 although the pawl has been raised beforehand by the fixed stop. The fixed stop 201 of the engagement system 106A is disposed at a height to move away from the non-return stop 213 and to meet the ramp 207 of the pawl. The fixed stop 201 is disposed at the front of the movable stop 203 in the engagement system. The non-return stop 213 is disposed behind the ramp 207, in the sequencing system. The gap, considered according to the longitudinal direction, between the fixed stop 201 and the movable stop 203 of the engagement system is smaller than the gap between the non-return stop 213 and the ramp 207 of the sequencing system. Thus, an anti-return locking at first and then an unlocking of the sequencing systems are ensured.

FIG. 15B represents a perspective view of the elements of the synchronisation system, in the second embodiment.

The engagement system and the sequencing system are guided relative to each other for better reliability. The engagement system comprises side tabs 204 bearing against the sequencing system. Moreover, the sequencing system comprises its longitudinal passage 211 receiving the flexible stop 203 and the fixed stop of the engagement system.

Advantageously, the non-return ramp, the pawl and the fixed stop of the sequencing system lie opposite this passage, to ensure the reliability of the interactions.

FIG. 16A represents a sectional view of the configuration of the synchronisation system, in the second embodiment, during a first step.

The two sequencing systems are secured together on the one hand via the support of the lower 215 and upper 216 wedging stops and on the other hand via the movable stop 212 of the sequencing system held by the fixed stop 214 on the other sequencing system. This fixed stop 214 is disposed opposite the passage formed by the arms of the movable stop 212. This fixed stop 214 is also disposed opposite the pawl held in the lowered position against the support and bearing on the movable stop.

FIG. 16B represents a sectional view of the configuration of the synchronisation system, in the second embodiment, during a second step.

The engagement system has moved closer and its movable stop 203 is not yet deformed, just before contact thereof with the ramp of the anti-return stop 213.

FIG. 16C represents a sectional view of the configuration of the synchronisation system, in the second embodiment, during a third step.

The engagement system has advanced again, its movable stop 203 being pushed by the ramp of the non-return stop 213.

FIG. 16D represents a sectional view of the configuration of the synchronisation system, in the second embodiment, during a fourth step.

The engagement system has advanced again, its movable stop 203 having passed the non-return stop 213 which now prevents a backward movement. Thus, the engagement system is held in position with respect to the sequencing system. The fixed stop 201 is positioned just before its contact with the ramp 207 of the pawl.

FIG. 16E represents a sectional view of the configuration of the synchronisation system, in the second embodiment, during a fifth step.

The sequencing systems are herein separated. The fixed stop 201 has pushed back the pawl whose pin 208 has cleared the movable stop of the other sequencing system. The pawl bears against the projecting stop 214. The engagement system is now with its fixed stop 201 bearing against the movable stop of the sequencing system and with its movable stop 201 bearing against the ramp of the sequencing system. Advantageously, this allows limiting the stroke of the lower indexer segment.

FIG. 16F represents a sectional view of the configuration of the synchronisation system, in the second embodiment, during a sixth step.

A tension is exerted at the tip of the mast during deployment. This tension exerted at the tip of the mast has brought the movable stop 203 of the engagement system against the non-return stop 213 of the sequencing system. For example, conical bearing surfaces are provided to prevent any sliding of these stops on each other. Thus, the engagement system is secured to the sequencing system.

FIG. 17 schematically represents the states of the synchronisation systems, on the one hand between the segments 101_i+1 and 101_i, and on the other hand between the segments 101_i and 101_i+1, by comparing the first and second embodiments.

The internal segment moves longitudinally during the successive phases denoted A, B, C, D, E and F. The synchronisation system performs on the one hand the joining, indicated in dotted lines, of an engagement system and a sequencing system and on the other hand the separation, indicated in continuous lines, of two sequencing systems.

In the first embodiment, indicated in double lines, the joining of the engagement system and the sequencing system is carried out progressively during phase D, whereas the separation of the two sequencing systems is also carried out progressively from phase D to phase E. In the second embodiment, indicated in a single line, the joining of the engagement system and a sequencing system is carried out abruptly in phase D then, also abruptly, the separation of the two sequencing systems occurs in phase E.

The invention claimed is:

1. A telescopic mast, comprising:
coaxial segments which can be controlled from a stowed position to a deployed position,
a set of guide systems disposed between adjacent segments,
a set of systems for synchronising the segments during deployment, and
a system for driving the segments from the stowed position to the deployed position,
wherein each segment is composed of the same determined number of angle sections secured together and extending over the entire length of said segment, said number of angle sections being at least three, each segment having a cross-section forming a polygon whose angle sections occupy the vertices of the polygon,
each angle section comprising a flat central portion bordered by two side wings,
wherein each guide system is disposed on the flat central portion of the corresponding angle section and includes rollers,
wherein the angle sections of two adjacent segments facing one another, each guide system disposed between two adjacent segments being fastened to one of the angle sections of one of said two adjacent segments and the rollers rolling on the central portion of the opposite angle section belonging to the other one amongst said two adjacent segments,
wherein the synchronisation system includes engagement systems and sequencing systems each positioned on an angle section so as to ensure a new drive of one of the segments then a release of a previously immobilised segment, each coaxial segment located between a fixed segment and an end segment, comprising at least one engagement system and a sequencing system fastened on one of the angle sections of the respective coaxial segment, the end segment carrying an engagement system and the fixed segment carrying a sequencing system, the engagement system of a first segment cooperating with the sequencing system fastened on the angle section facing an adjacent second segment, the sequencing system of the second segment cooperating with the sequencing system fastened on the angle section facing an adjacent third segment, an advance of each segment inducing at least securing of one of the engagement systems with one of the sequencing systems and inducing at least the separation of two of the sequencing systems.

2. The telescopic mast according to claim 1, wherein in each segment, each of the angle sections comprises a three-sided profile made of woven fibres forming the central portion and the wings, the neighbouring wings, from one angle section to another, being disposed in the same plane, the angle sections being secured together by securing elements made of fibres pressed on the three-sided profiles, the angle sections and the securing elements being made in one piece, by hardening the fibres.

3. The telescopic mast according to claim 1, wherein the angle sections are secured together by at least two windings per angle section, said two windings being wound respectively clockwise and counterclockwise around the angle sections and starting at two opposite ends of each angle section, said two windings extending over the entire length of the segment, the windings comprising a plurality of plies being interwoven at junction points of the windings.

4. The telescopic mast according to claim 1, wherein the number of angle sections per segment being equal to three, each guide system, between two adjacent segments, comprises two pairs of rigid spreaders each carrying two rollers movable in rotation and a pair of flexible spreaders each carrying two rollers movable in rotation, each pair of rigid and flexible spreaders being disposed between two angle sections facing one another, the pairs of rigid and flexible spreaders being fastened to one of the ends of the segment in an area corresponding to an overlap of the adjacent segments in the deployed position.

5. The telescopic mast according to claim 1, wherein each engagement system comprises an outer hooking rod secured to said angle section of the first segment, the hooking rod driving a hook cam of the sequencing system of the second segment, the hook cam being movable in rotation relative to said angle section of the second segment up to a position of abutment and lateral blocking of the hooking rod, the hook cam controlling a position of a lock in the shape of hooks and movable in rotation relative to said angle section of the second segment up to a locked position where the lock performs a complementary lateral blocking of the hooking rod, the lock further comprising a finger for blocking the sequencing system of said third segment, this finger disengaging to release the sequencing system of the third segment in the locked position.

6. The telescopic mast according to claim 1, wherein the engagement system of the first segment comprises a fixed stop and a movable stop, the sequencing system of the second segment comprising a fixed non-return stop cooperating with the movable stop of the engagement system, the sequencing system of the second segment comprising a fixed stop holding a movable stop of the sequencing system of the third segment, the sequencing system of the second segment comprising a pivotable pawl ramp of which is actuated by the fixed stop of the engagement system of the first segment to clear the movable stop of the sequencing system of the third segment, the ramp of the pawl as well as the fixed stop and the movable stop being arranged so as to fit into a passage arranged between flexible arms carrying the movable stop of the sequencing system of the second segment.

7. A telescopic mast, comprising:
coaxial segments which can be controlled from a stowed position to a deployed position,
a set of guide systems disposed between adjacent segments,
a set of systems for synchronising the segments during deployment, and
a system for driving the segments from the stowed position to the deployed position,
  wherein each segment is composed of the same determined number of angle sections secured together and extending over the entire length of said segment, said number of angle sections being at least three, each segment having a cross-section forming a polygon whose angle sections occupy the vertices of the polygon, each angle section comprising a flat central portion bordered by two side wings, the angle sections of two adjacent segments facing one another, each guide system disposed between two adjacent segments being fastened to one of the angle sections of one of said two adjacent segments and comprising rollers rolling on the central portion of the opposite angle section belonging to the other one amongst said two adjacent segments,
  wherein the drive system includes a threaded rod controlled in rotation and cooperating successively with nuts connected to bases of the segments, with an exception of a fixed outer segment, each nut being held with a longitudinal clearance in a peripheral support also connected to deformable arms disposed in a radial plane of the nut, these arms being also fastened to beams secured to the angle sections.

8. The telescopic mast according to claim 7, wherein the deformable arms, in undeformed position, bear on wedges disposed parallel to the radial plane of the nut to prevent a translation of the nut towards the base of the mast and enable a translation of the nut towards the distal end of the segment.

9. The telescopic mast according to claim 7, wherein in each segment, each of the angle sections comprises a three-sided profile made of woven fibres forming the central portion and the wings, the neighbouring wings, from one angle section to another, being disposed in the same plane, the angle sections being secured together by securing elements made of fibres pressed on the three-sided profiles, the angle sections and the securing elements being made in one piece, by hardening the fibres.

10. The telescopic mast according to claim 7, wherein the angle sections are secured together by at least two windings per angle section, said two windings being wound respectively clockwise and counterclockwise around the angle sections and starting at two opposite ends of each angle section, said two windings extending over the entire length of the segment, the windings comprising a plurality of plies being interwoven at junction points of the windings.

11. The telescopic mast according to claim 7, wherein the number of angle sections per segment being equal to three, each guide system, between two adjacent segments, comprises two pairs of rigid spreaders each carrying two rollers movable in rotation and a pair of flexible spreaders each carrying two rollers movable in rotation, each pair of rigid and flexible spreaders being disposed between two angle sections facing one another, the pairs of rigid and flexible spreaders being fastened to one of the ends of the segment in an area corresponding to an overlap of the adjacent segments in the deployed position.

12. A telescopic mast, comprising:
coaxial segments which can be controlled from a stowed position to a deployed position,
a set of guide systems disposed between adjacent segments,
a set of systems for synchronising the segments during deployment, and
a system for driving the segments from the stowed position to the deployed position,
  wherein each segment is composed of the same determined number of angle sections secured together and extending over the entire length of said segment, said number of angle sections being at least three, each segment having a cross-section forming a polygon whose angle sections occupy the vertices of the polygon, each angle section comprising a flat central portion bordered by two side wings, wherein the neighbouring wings, from one angle section to another, are disposed in the same plane, the angle sections of two adjacent segments facing one another, each guide system disposed between two adjacent segments being fastened to one of the angle sections of one of said two adjacent segments and comprising rollers rolling on the central portion of the opposite angle section belonging to the other one amongst said two adjacent segments, wherein the synchronisation system includes engagement systems and sequencing systems each positioned on an angle section so as to ensure a new drive of one of the segments then a release of a previously immobilised segment, each coaxial segment located between a fixed segment and an end segment, comprising at least one engagement system and a sequencing system fastened on one of the angle sections of the respective coaxial segment, the end segment carrying an engagement system and the fixed segment carrying a sequencing system, the engagement system of a first segment cooperating with the sequencing system fastened on the angle section facing an adjacent second segment, the sequencing system of the second segment cooperating with the sequencing system fastened on the angle section facing an adjacent third segment, an advance of each segment inducing at least securing of one of the engagement systems with one of the sequencing systems and inducing at least the separation of two of the sequencing systems.

13. A telescopic mast, comprising:

coaxial segments which can be controlled from a stowed position to a deployed position, a set of guide systems disposed between adjacent segments, a set of systems for synchronising the segments during deployment, and a system for driving the segments from the stowed position to the deployed position, wherein each segment is composed of the same determined number of angle sections secured together and extending over the entire length of said segment, said number of angle sections being at least three, each segment having a cross-section forming a polygon whose angle sections occupy the vertices of the polygon, each angle section comprising a flat central portion bordered by two side wings, the angle sections of two adjacent segments facing one another, each guide system disposed between two adjacent segments being fastened to one of the angle sections of one of said two adjacent segments and comprising rollers rolling on the central portion of the opposite angle section belonging to the other one amongst said two adjacent segments, wherein the synchronisation system includes engagement systems and sequencing systems each positioned on an angle section so as to ensure a new drive of one of the segments then a release of a previously immobilised segment, each coaxial segment located between a fixed segment and an end segment, comprising at least one engagement system and a sequencing system fastened on one of the angle sections of the respective coaxial segment, the end segment carrying an engagement system and the fixed segment carrying a sequencing system, the engagement system of a first segment cooperating with the sequencing system fastened on the angle section facing an adjacent second segment, the sequencing system of the second segment cooperating with the sequencing system fastened on the angle section facing an adjacent third segment, an advance of each segment inducing at least securing of one of the engagement systems with one of the sequencing systems and inducing at least the separation of two of the sequencing systems, and wherein the angle sections are secured together by a plurality of windings.

\* \* \* \* \*